(12) United States Patent
Shimizu et al.

(10) Patent No.: US 8,674,533 B2
(45) Date of Patent: Mar. 18, 2014

(54) ENGINE CONTROL DEVICE, VEHICLE, AND ENGINE CONTROL METHOD

(75) Inventors: Yuichiro Shimizu, Kobe (JP); Yoshinori Shibachi, Kobe (JP); Ryoh Izumoto, Kobe (JP); Motoki Komiya, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 205 days.

(21) Appl. No.: 13/392,356

(22) PCT Filed: Aug. 24, 2010

(86) PCT No.: PCT/JP2010/064211
§ 371 (c)(1), (2), (4) Date: Feb. 24, 2012

(87) PCT Pub. No.: WO2011/024772
PCT Pub. Date: Mar. 3, 2011

(65) Prior Publication Data

US 2012/0153638 A1 Jun. 21, 2012

(30) Foreign Application Priority Data

Aug. 26, 2009 (JP) ................................ 2009-195705
Sep. 8, 2009 (JP) ................................ 2009-207098

(51) Int. Cl.
*B60L 11/12* (2006.01)

(52) U.S. Cl.
USPC ........................................................ 290/17

(58) Field of Classification Search
USPC ................................ 290/17, 16, 50, 21, 40 C
See application file for complete search history.

(56) References Cited

U.S. PATENT DOCUMENTS

| | | | | |
|---|---|---|---|---|
| 5,359,228 A * | 10/1994 | Yoshida | 290/17 |
| 6,335,574 B1 | 1/2002 | Ochiai et al. | |
| 6,492,741 B1 * | 12/2002 | Morimoto et al. | 290/40 C |
| 6,624,528 B2 * | 9/2003 | Shimizu et al. | 290/40 C |
| 7,533,746 B2 * | 5/2009 | Yamaguchi | 180/65.29 |
| 8,170,736 B2 * | 5/2012 | Muta | 701/22 |

(Continued)

FOREIGN PATENT DOCUMENTS

| | | |
|---|---|---|
| JP | A-10-184505 | 7/1998 |
| JP | A-2001-065437 | 3/2001 |

(Continued)

OTHER PUBLICATIONS

International Search Report in International Application No. PCT/JP2010/064211; dated Dec. 7, 2010 (with English-language translation).

*Primary Examiner* — Jean F Duverne
(74) *Attorney, Agent, or Firm* — Oliff PLC

(57) ABSTRACT

Engine control device includes a delay unit which delays or cuts off a flow of current from a first current system, which directs current to a coil, to a second current system, which directs current to a starter motor. When a starter switch, which turns the flow of current from the power source to the first current system on or off, is turned on and electricity flows to the first current system, the delay unit delays the current flowing from the first current system to the second current system. When electricity flows to the first current system as a result of a controller having turned a first switch on, the delay unit cuts off the flow of electricity from the first current system to the second current system.

17 Claims, 22 Drawing Sheets

(56) References Cited

U.S. PATENT DOCUMENTS

| | | | | |
|---|---|---|---|---|
| 8,314,578 | B2 * | 11/2012 | Namuduri et al. | 318/400.3 |
| 8,381,851 | B2 * | 2/2013 | Gray, Jr. | 180/65.28 |
| 8,485,293 | B2 * | 7/2013 | Wagner | 180/65.265 |

FOREIGN PATENT DOCUMENTS

| | | |
|---|---|---|
| JP | A-2002-161838 | 6/2002 |
| JP | A-2004-011627 | 1/2004 |
| JP | A-2007-327395 | 12/2007 |

* cited by examiner

ENGINE CONTROL DEVICE, VEHICLE, AND ENGINE CONTROL METHOD

TECHNICAL FIELD

The present invention relates to a technology for controlling the startup of an engine in a vehicle.

BACKGROUND ART

In a vehicle which travels using an engine as a driving source, an engine control device for controlling a startup of the engine is included.

The engine control device controls a starter system driving a starter motor to perform a cranking control of the engine when the starter switch is operated by a user.

As the starter switch is operated by a user and the starting switch is turned on, the starter system controls a drive lever of a plunger to engage a pinion gear provided in an output shaft of the starter motor with a ring gear provided in an output shaft of the engine and to rotationally control the starter motor. In this way, the starter motor can be driven.

The drive lever can be controlled in such a way that a starter switch is operated by a user to cause the starting switch to turn on, an electric current is caused to flow from a battery mounted on the vehicle to a coil and an electromagnet opposed to the coil is magnetized. In this way, a magnetized electromagnet can move the drive lever in a direction opposite to the direction of an output shaft of the starter motor.

The pinion gear provided on the output shaft of the starter motor is connected to the drive lever. And thus, as the drive lever is controlled, the pinion gear moves in the direction opposite to the direction of the output shaft of the starter motor to engage with the ring gear provided in the output shaft of the engine which is located in a position opposite to the starter motor.

An abnormal noise can be occurred when the ring gear and the pinion gear are engaged with each other. The abnormal noise can be decreased when the teeth of each gear are smoothly engaged with the valleys of each gear, whereas the abnormal noise can be increased when the teeth of each gear are harshly engaged with the valleys of each gear. In order to suppress the abnormal noise, it is necessary to smoothly engage the teeth of each gear with the valleys of each gear. That is, it is necessary to engage the teeth of each gear with the valleys of each gear in a static state.

For example, in Patent Document 1, there is disclosed a technology which is capable of suppressing occurrence of the abnormal noise by driving the starter motor in a state where the gears are engaged with each other. Specifically, since the starter motor is driven after the electric current flows to the coil and then the gears are engaged with each other, the gears can be engaged with each other at timing when the gears are not rotated. Accordingly, it is possible to suppress the occurrence of the abnormal noise.

It is preferable that such a control is realized not by a software control including operating means such as a CPU, but by a hardware control such as a logic circuit which has no operating means such as a CPU and has a lower failure rate as compared to the software control. The reason is that since a faculty startup of the engine is a most important factor which significantly degrades the commodity value as compared to other malfunctions, it is extremely required that such a faculty startup of the engine is suppressed.

Meanwhile, as an example of a startup control of the engine, a startup control using an idling stop function can be exemplified. In the startup control using the idling stop function, in a time interval from a timing when a user operates a starter switch to turn on a starting switch, thereby turning on the engine to a timing when a user operates an ignition switch to an off state, thereby turning off the engine, the engine is stopped when a condition such as a stop of the vehicle is satisfied and the engine is started when a condition such as an acceleration operation by a user is satisfied.

Basically, in the startup control using the idling stop function, the engine is stopped when the vehicle is temporarily stopped and the engine is started when the vehicle departs. Accordingly, there is a trend that the startup control is frequently occurred.

In the startup control using the idling stop function, although it is necessary to rapidly start up the engine for improving user's convenience, the coil and the electromagnet which drive the drive lever of the starter system have a physical property that it is more difficult to generate a magnetic power for driving the drive lever in the electromagnet as an ambient temperature thereof becomes lower. Accordingly, in a case where the ambient temperature of the coil and the electromagnet is low, it is required to lengthen a time interval (delay time) from a timing when electricity flows to the coil to cause the gears to be engaged to a timing when the starter motor is controlled to be driven, as compared to a case where the ambient temperature is high.

In order to realize the startup control by the hardware control, a time capable of assuring a minimum actuating time of the plunger should be set as the delay time because it is not possible to suitably change the delay time according to the ambient temperature of the coil or the electromagnet. That is, a delay time in a case that a temperature of the coil or the electromagnet is lower should be set as the delay time. In this regard, despite the fact that the delay time in a high ambient temperature can be short as compared to a delay time in a lower ambient temperature, the starter system in a state of the high ambient temperature should be controlled based on a delay time in the lower ambient temperature. Accordingly, it is difficult to improve the startup performance of the engine.

Accordingly, in the startup control using the idling stop function, it is preferable that the startup control is realized by the software control in which the delay time is set according to the detected ambient temperature of the coil or the electromagnet to improve the startup performance of the engine in the high ambient temperature and to assure the startup of the engine in the low ambient temperature while preventing occurrence of the abnormal noise.

In this way, it is considered that the engine is started up based on the hardware control when the startup of the engine is controlled by operating the starter switch to turn on the starting switch, and the engine is started up based on the hardware control when the startup of the engine is controlled by the idling stop function.

RELATED ART

Patent Document

Patent Document 1: Japanese Patent Application Publication No. 2004-11627

DISCLOSURE OF INVENTION

Technical Problems to be Solved by Invention

In this case, both the hardware control and the software control eventually use the same current system for causing electricity to flow in order to control the same coil or the starter motor. Specifically, a current system which connects a hardware control unit to the coil or the starter motor and a current system which connects a software control unit to the coil or the starter motor are commonly used as the same current system immediately before meeting the coil or the starter motor.

However, when such a configuration is simply employed, there is a problem that electricity controlled by the software control unit may flow into the hardware control unit to cause malfunction of the starter motor. That is, electricity which flows in the current system connected to the coil can flow into the current system through which the hardware control unit controls the starter motor, causing the starter motor to drive at an undesired timing.

Further, even if the startup of the engine is controlled by the hardware control unit which has a lower failure rate, a malfunction may be caused. Similarly, when the startup of the engine is controlled by the software control unit, a malfunction may be caused.

In consideration of the above situation, the first object of the present invention is to provide an engine-start control technology that can prevent abnormal noises from occurring when controlling a starter system and malfunctions from occurring when an engine is started.

The second object of the present invention is to provide an engine-start control technology that can start up the engine even if the hardware control unit or the software control unit is failed.

Means for Solving Problems

In order to achieve the above objects, according to a first aspect of the present invention, there is provided an engine control device for controlling a startup of an engine in a vehicle by directing an electric current from a power source to a starter motor and a coil for switching a connection state between an output shaft of the starter motor and the engine, the engine control device includes a delay unit configured to delay and cut-off a flow of the electric current from a first current system which directs the electric current to the coil to a second current system which directs the electric current to the starter motor; and a control unit configured to control a first switch to be energized by turning on the electric current from the power source to the first current system and to be cut-off by turning off the electric current from the power source to the first current system, and to control a second switch to be energized by turning on the electric current from the power source to the second current system and to be cut-off by turning off the electric current from the power source to the second current system, wherein the delay unit delays a flow of the electric current from the first current system to the second current system when a starting switch which is configure to be energized when a user turns on the electric current from the power source to the first current system and to be cut off when the user turns off the electric current from the power source to the first current system is turned on to cause the electric current to flow in the first current system, and wherein the delay unit cuts off the flow of the electric current from the first current system to the second current system when the first switch is turned on to cause the electric current to flow in the first current system.

The delay unit may causes the electric current to flow in the second current system at a timing delayed from a timing when the starting switch is turned on to cause the electric current to flow in the first current system.

The control unit may turn on the second switch to cause the electric current to flow in the starter motor at a timing delayed from a timing when the first switch is turned on to cause the electric current to flow in the coil.

The engine control device may further include a temperature detecting unit configured to detect a temperature of the coil, and the control unit may turn on the first switch to cause the electric current to flow in the coil, and then turn on the second switch to cause the electric current to flow in the starter motor after a predetermined time determined according to the temperature.

The engine control device may further include a detecting unit configured to detect that an accelerator operation is performed by user's operation, and the control unit may turn on the first switch when the accelerator operation is turned on in a state where the engine is stopped by an idling stop function.

The idling stop function may cause the accelerator operation to be turned off when a speed of the vehicle is equal to or higher than a predetermined speed and cause the engine to be stopped when the speed of the vehicle is lower than the predetermined speed.

The idling stop function may cause the accelerator operation to be turned off when an rpm of the engine is equal to or higher than a predetermined rpm and cause the engine to be stopped when the rpm of the engine is lower than the predetermined rpm.

According to a second aspect of the present invention, there is provided a vehicle including an engine; a starter motor configured to start up the engine; a coil configured to switch a connection state between an output shaft of the starter motor and the engine; and the engine control device mentioned above and configured to control a startup of the engine by directing an electric current from a power source to the starter motor and the coil.

According to the above configurations, the delay unit delays the electric current flowing from the first current system to the second current system when the starting switch is turned on by user's operation and cuts off the electric current flowing from the first current system to the second current system when the starting switch is turned on by user's operation in a state where the first switch is turned on. Accordingly, when the first and second switches are controlled to start up the engine, it is possible to prevent the electric current from flowing from the first current system to the second current system. As a result, it is possible to prevent the starter motor from being driven at an undesired timing.

Further, when a user turns on the starting switch to start up the engine, the engine can be started while preventing an abnormal noise being occurred.

In addition, since the starter motor can be driven after the output shaft of the starter motor is connected to the engine when the startup of the engine is controlled by the control unit, the engine can be started while preventing an abnormal noise being occurred.

Furthermore, when a user tries to restart the engine from a state where the engine is stopped by the idling stop function, the engine can be started while preventing an abnormal noise being occurred.

According to a third aspect of the present invention, there is provided an engine control device for controlling a startup of an engine in a vehicle by directing an electric current from a power source to a starter motor and a coil for switching a connection state between an output shaft of the starter motor and the engine, the engine control device includes a first current system configured to direct the electric current from the power source to the coil; a second current system branched from the first current system and configured to direct the electric current to the starter motor; a first switch provided in the second current system and configured to energize or cut off the electric current directing from the first current system to the starter motor by being turned on or off; a delay circuit configured to control the first switch to direct the electric current to the coil and then to direct the electric current to the starter motor while delaying the electric current directed to the coil; a third current system configured to direct the electric current from the power source to the coil; a second switch provided in the third current system and configured to energize or cut off the electric current directing from the power source to the coil by being turned on or off; a fourth current system configured to direct the electric current from the power source to the starter motor; a third switch provided in the fourth current system and configured to energize or cut off the electric current directing from the power source to the starter motor by being turned on or off; a control unit configured to control the second switch and the third switch for performing an engine startup control; a first detecting unit configured to detect the voltage on a side of the power source rather than the first switch provided in the second current system; and a second detecting unit configured to detect the voltage on a side of the starter motor rather than the first switch provided in the second current system, and the control unit controls the third switch to start up the engine when an off-fixation error of the first switch is detected based on a voltage detected by the first detecting unit and a voltage detected by the second detecting unit in a state where a starting switch is provided in the first current system and turned on by user's operation.

The engine control device may further include a temperature detecting unit configured to detect a temperature of the coil, and the control unit may turn on the second switch to cause the electric current to flow in the coil, and then turn on the third switch to cause the electric current to flow in the starter motor after a predetermined time determined according to the temperature.

The control unit may turn on the first switch when a voltage difference between the voltage detected by the first detecting unit and the voltage detected by the second detecting unit is equal to or higher than a predetermined value in a state where the starting switch is turned on by user's operation, and then control the second switch and the third switch to start up the engine when the voltage difference is still equal to or higher than the predetermined value.

The control unit may turn on the third switch and then, turn on the first switch and the second switch to direct the electric current from the third current system to the second current system when the voltage detected by the second detecting unit is equal to or lower than a predetermined voltage.

The delay circuit may control the first switch to direct the electric current to the coil and then to direct the electric current to the starter motor while delaying the electric current directed to the coil when the starting switch is turned on by user's operation, and turn off the first switch to cut off the electric current directing to the starter motor when the second switch is turned off by the control unit.

According to a fourth aspect of the present invention, there is provided a vehicle including an engine; a starter motor configured to start up the engine; a coil configured to switch a connection state between an output shaft of the starter motor and the engine; and the engine control device mentioned above and configured to control a startup of the engine by directing an electric current from a power source to the starter motor and the coil.

Further, according to a fifth aspect of the present invention, there is provided an engine control method for controlling a startup of an engine in a vehicle by directing an electric current from a power source to a starter motor and a coil for switching a connection state between an output shaft of the starter motor and the engine, the vehicle includes a first current system configured to direct the electric current from the power source to the coil; a second current system branched from the first current system and configured to direct the electric current to the starter motor; a first switch provided in the second current system and configured to energize or cut off the electric current directing from the first current system to the starter motor by being turned on or off; a delay circuit configured to control the first switch to direct the electric current to the coil and then to direct the electric current to the starter motor while delaying the electric current directed to the coil; a third current system configured to direct the electric current from the power source to the coil; a second switch provided in the third current system and configured to energize or cut off the electric current directing from the power source to the coil by being turned on or off; a fourth current system configured to direct the electric current from the power source to the starter motor; a third switch provided in the fourth current system and configured to energize or cut off the electric current directing from the power source to the starter motor by being turned on or off; a control unit configured to control the second switch and the third switch for performing an engine startup control; a first detecting unit configured to detect the voltage on a side of the power source rather than the first switch provided in the second current system; and a second detecting unit configured to detect the voltage on a side of the starter motor rather than the first switch provided in the second current system, and the engine control method includes detecting an off-fixation error of the first switch based on a voltage detected by the first detecting unit and a voltage detected by the second detecting unit when a starting switch provided in the first current system is turned on by user' operation to cause the electric current to flow in the second current system; and controlling the third switch to start up the engine when the off-fixation error of the first switch is detected.

According to a sixth aspect of the present invention, there is provided an engine control device for controlling a startup of an engine in a vehicle by directing an electric current from a power source to a starter motor and a coil for switching a connection state between an output shaft of the starter motor and the engine, the engine control device includes a first current system configured to direct the electric current from the power source to the coil by turning on or off a starting switch mounted therein; a second current system branched from the first current system and configured to direct the electric current to the starter motor; a first switch provided in the second current system and configured to energize or cut off the electric current directing from the first current system to the starter motor by being turned on or off; a delay circuit configured to control the first switch to direct the electric current to the coil and then to direct the electric current to the starter motor while delaying the electric current directed to the coil; a third current system configured to direct the electric current from the power source to the coil; a second switch provided in the third current system and configured to energize or cut off the electric current directing from the power source to the coil by being turned on or off; a fourth current system configured to direct the electric current from the power source to the starter motor; a third switch provided in the fourth current system and configured to energize or cut off the electric current directing from the power source to the starter motor by being turned on or off; a control unit configured to control the second switch and the third switch for performing an engine startup control; and a detecting unit configured to detect the voltage on a side of the starter motor rather than the third switch provided in the second current system, and the control unit turns on the third switch, and then turns on the first switch and the second switch when the voltage detected by the detecting unit is equal to or lower than a predetermined voltage.

According to a seventh aspect of the present invention, there is provided an engine control device for controlling a startup of an engine in a vehicle by directing an electric current from a power source to a starter motor and a coil for switching a connection state between an output shaft of the starter motor and the engine, the engine control device includes a first current system configured to direct the electric current from the power source to the coil; a second current system branched from the first current system and configured to direct the electric current to the starter motor; a first switch provided in the second current system and configured to energize or cut off the electric current directing from the first current system to the starter motor by being turned on or off; a delay circuit configured to control the first switch to direct the electric current to the coil and then to direct the electric current to the starter motor while delaying the electric current directed to the coil; a third current system configured to direct the electric current from the power source to the coil; a second switch provided in the third current system and configured to energize or cut off the electric current directing from the power source to the coil by being turned on or off; a fourth current system configured to direct the electric current from the power source to the starter motor; a third switch provided in the fourth current system and configured to energize or cut off the electric current directing from the power source to the starter motor by being turned on or off; a control unit configured to control the second switch and the third switch for performing an engine startup control; a first detecting unit configured to detect the voltage on a side of the power source rather than the first switch provided in the second current system; and a second detecting unit configured to detect the voltage on a side of the starter motor rather than the first switch provided in the second current system, and the control unit controls the third switch to start up the engine when a voltage difference between a voltage detected by the first detecting unit and a voltage detected by the second detecting unit is equal to or higher than a predetermined value in a state where a starting switch provided in the first current system is turned on by user's operation.

Advantageous Effect of Invention

According to the above configurations, when the starter motor cannot be driven because the first switch is in a state of an off-fixation error in a state where the starting switch is turned on by user's operation, the control unit can control the third switch to drive the starter motor. Accordingly, the faculty startup of the engine can be avoided.

Further, since a time difference from a timing when the output shaft of the starter motor is connected to the engine to a timing when an electricity is directed to the starter motor can be determined according to the ambient temperature of the coil, the engine, can be efficiently started in both high temperature condition and low temperature condition while preventing an abnormal noise being occurred.

Further, the first switch is turned on when the off-fixation error is estimated based on a voltage difference between the upstream side and the downstream side of the first switch. Even in this case, if there is a voltage difference, the off-fixation error is determined. In this way, the reliability of the off-fixation error can be enhanced so that a fail-safe control can be surely performed. That is, there is no case that the fail-safe control is carried out in vain.

Further, when the starter motor cannot be driven because the control unit turns on the third switch and at this time the third switch is in a state of an off-fixation error, the control unit can control the first and second switches to drive the starter motor. Accordingly, the faculty startup of the engine can be avoided.

In addition, when the starter motor cannot be driven because the first switch is in a state of an off-fixation error in a state where the starting switch is turned on by user's operation, the control unit controls the second and third switches to drive the starter motor. At this time, electricity can be generated. In this case, it is possible to prevent electricity from flowing into the delay circuit, thereby causing malfunctions.

BRIEF DESCRIPTIONS OF DRAWINGS

MODE TO CARRY OUT INVENTION

Hereinafter, the embodiment of the present invention will be described by referring to accompanying drawings.

<Embodiment>

(Control Circuit)

A control circuit for performing a startup control of an engine will be described by referring to FIG. 1 when a starter switch is operated by a user to turn on a starting switch.

(Current System A)

Figure 1:
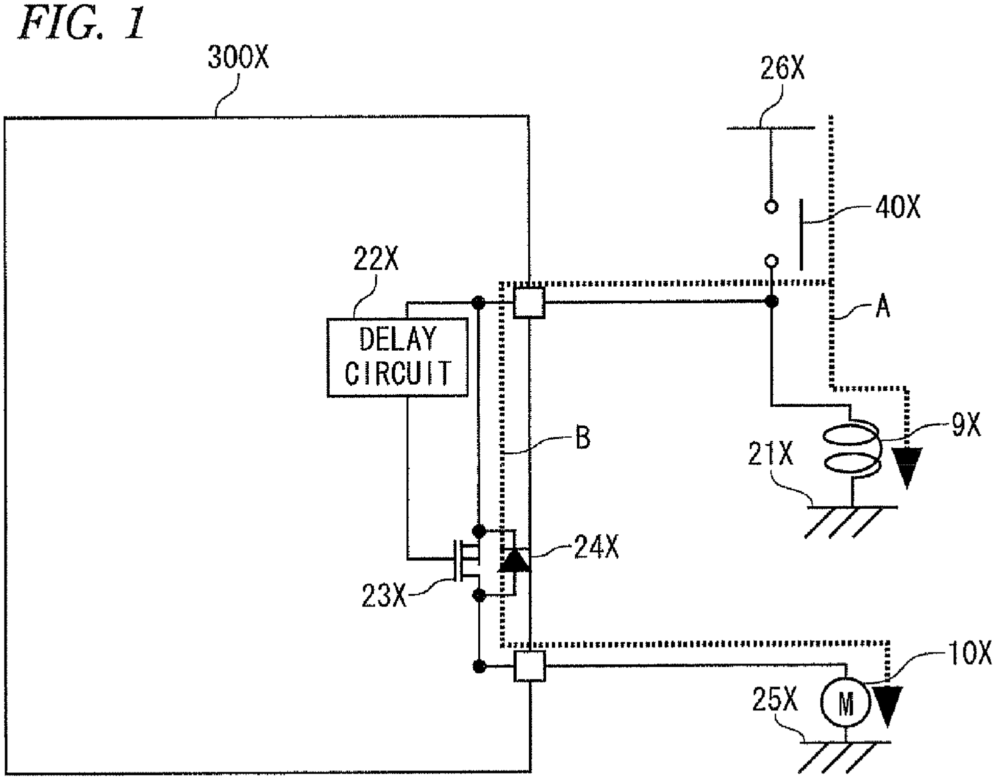
FIG. 1 is a circuit diagram for explaining an engine control device and a starter system.

As illustrated in FIG. 1, a current system A is provided in a vehicle to cause an electricity to flow from a power source 26X as a first power source installed in the vehicle to a ground part 21X. In the current system A, a starting switch 40X and a coil 9X are provided from the power source.

By operating the starter switch by a user, the starting switch 40X of a starter system is turned from an off state to an on state. As the starting switch 40X is turned from an off state to an on state, electricity is caused to flow in the current system A from the power source 26X to the ground part 21X.

As a result, electricity is caused to flow in the coil 9X to control a plunger and thus a pinion gear of s starter motor 10X and a ring gear of the engine are engaged to each other.

(Current System B)

Next, in the vehicle, a current system B is branched from between the starting switch 40X and the coil 9X in the current system A to cause electricity to flow to a ground part 25X via an engine control device 300X.

In the current system B inside the engine control device 300X, a switch 23X which is configured to cutoff or to allow the electric current flowing from the current system A to the current system B by being turned on or off and a delay circuit 22X which is configured to input the electric current flowing to the current system A and to control the switch 23X from an off state to an on state at a timing delayed from the input operation are provided. The switch 23X is provided with a diode 24X for preventing the back-flow of the electric current. Further, in the current system B causing the electric current to flow to the ground part 25X via the engine control device 300X, a starter motor 10X is provided between the engine control device 300X and the ground part 25X.

By this configuration, since the electric current is branched from the current system A and temporarily flows to the engine control device 300X when the electric current flows in the current system A, the delay switch 22X inside the engine control device 300X can delay the flow of the electric current to the current system 13 downstream from the switch 23X. Hereinafter, in each current system, the power source side is referred to as an upstream side and the ground part side is referred to as a downstream side.

As a result, by causing the electric current flowing in the current system A to flow to the current system B at a delayed timing, the starter motor 10X can be driven after the pinion gear of the starter motor 10X and the ring gear of the engine are engaged with each other at a timing when both gears are in a static state. Accordingly, the engine can be started while preventing an abnormal noise being occurred.

(Control Circuit)

A control circuit which is constituted by adding a control circuit for realizing the idling stop function to the control circuit mentioned by referring to FIG. 1, that is, a control circuit which causes an operating unit 300Xa provided in the engine control device 300X to realize the engine control using the idling stop function will be described by referring to FIG. 2.

(Current System C)

A current system C is provided in the vehicle to extend from a power source 31X as a second power source installed in the engine control device 300X and to join with a part of the current system A between the starting switch 40X and the coil 9X, thereby causing electricity to flow to the ground part 21X through the coil 9X. In the current system C, the power source 31X side is provided in the engine control device 300X and the ground part 21X side is provided in the vehicle. That is, in the current system C, a portion of the ground part 21X side provided in the vehicle is commonly used as a portion of the current system A.

Further, in the current system C, a portion of the power source 31X side provided in the engine control device 300X includes a switch 27X as a first switch which allows or cuts off the electric current flowing from the power source 31X to the ground part 21X by being turned on or off. In addition, a diode 29X for preventing the back-flow of the electric current to the power source 31X is provided downstream from the switch 27X.

By causing the operating unit 300Xa of the engine control device 300X to turn on or off the switch 27X and thus to allow or cut off the electric current flowing from the power source 31X to the ground part 21X, the flow of the electric current to the coil 9X in the current system C can be controlled.

Meanwhile, when the operating unit 300Xa controls the switch 27X to cause the electric current to flow from the power source 31X to the ground part 21X, a diode 34X for preventing the flow of the electric current to the current system B via the current system A is provided between the starting switch 40X of the current system A and a joined part of the current system A and the current system B.

In this case, since the diode 34X is configured to prevent the malfunction of the delay circuit, the diode can be provided in an arbitrary position between the joined part and the delay circuit, as long as the diode can prevent the electric current from flowing in the delay circuit of the current system B.

The operating unit 300Xa provided in the engine control device 300X cooperates with the above control circuit to perform a startup control of the engine. At this time, when it is determined that the engine start condition in the idling stop function is satisfied, the electric current is caused flow in the coil 9X and is delayed by a delay time, and then the starter motor is driven. At this time, the operating unit 300Xa calculates the delay time according to a detecting temperature of the temperature detecting unit. For example, in this calculation, a map of a temperature stored on a non-volatile memory in advance and the delay time is used as a reference. The operating unit 300Xa controls the switch 27X from an off state to an on state, and after the delay time, controls the switch 28X from an off state to an on state.

(Current System D)

A current system D is provided in engine control device 300X to extend from a power source 32X as a third power source installed in the engine control device 300X and to join with a part of the current system B downstream from the switch 23X in the engine control device 300X, thereby causing electricity to flow to the ground part 25X of the vehicle. That is, in the current system D, a portion of the ground part 25X side provided in the vehicle is commonly used as a portion of the current system B.

Further, a portion of the current system D between the power source 32X and the joined part is provided with a switch 28X as a second switch which allows or cuts off the electric current flowing from the power source 32X to the ground part 25X by being turned on or off. In addition, a diode 30X for preventing the back-flow of the electric current to the power source 32X is provided in a portion of the current system D between the switch 28X and the joined part.

By causing the operating unit 300Xa of the engine control device 300X to turn on or off the switch 28X and thus to allow or cut off the electric current flowing from the power source 32X to the ground part 25X, the flow of the electric current to the starter motor 10X in the current system D can be controlled.

Meanwhile, when the operating unit 300Xa controls the switch 28X to cause the electric current to flow from the power source 32X to the ground part 25X, a diode 35X for preventing the flow of the electric current to the current system B is provided between the switch 23X of the current system B and the joined part of the current system A and the current system B.

In this case, since the diode 35X is configured to prevent the malfunction of the delay circuit, the diode can be provided in an arbitrary position between the joined part and the delay circuit, as long as the diode can prevent the electric current from flowing in the delay circuit of the current system B.

In this way, both the hardware control unit in which a user turns on the starting switch 40X to control a startup of the engine and the software control unit in which a startup of the engine is controlled by the idling stop function eventually use the same current system for causing electricity to flow in order to control the same coil 9X or the starter motor 10X.

When it is determined that the engine start condition in the idling stop function is satisfied, the operating unit 300Xa provided in the engine control device 300X cooperates with such a control circuit to cause the electric current to flow in the coil 9X and to delay the electric current by a delay time determined according to a detecting temperature of the temperature detecting unit, and then to turn on the switch 28X from an off state to an on state to drive the starter motor.

(Prevention of Malfunction of the Starter Motor 10X and Assurance of Minimum Actuation Voltage)

Herein, when two or more current systems are joined, since it is necessary to provide a diode in order to prevent electricity from flowing from one current system to another current system and also to cause the electricity to flow in a desired direction, the diode 34X or the diode 35X as mentioned above is provided.

However, since the diode can be a resistance even if electricity flows in a desired direction in the current system, it is necessary to apply the higher voltage as compared to a case where the diode is not provided. Accordingly, when a storage capacity of a battery as a main power source is lowered or the discharge ability of the batter is degraded due to a lower temperature, the starter system which is actuated with the diode being not provided may not be actuated with the diode being provided. That is, there is a problem that the minimum actuation voltage is increased.

In order to solve the problem, even if the diode 34X and the diode 35X are not provided, when the operating unit 300Xa performs the startup control of the engine using the idling stop function, there is problem that electricity flows into the delay circuit to erroneously actuate the starter motor.

Figure 3:
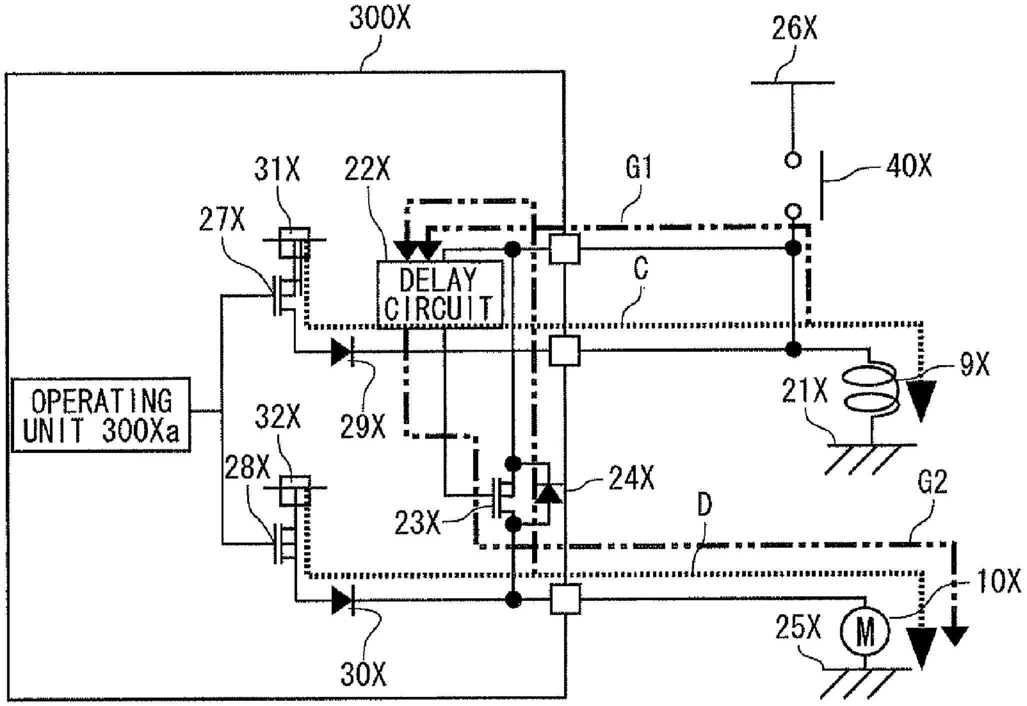
FIG. 3 is a circuit diagram for explaining an engine control device and a starter system.

A principle of the erroneous actuation of the starter motor will be described in detail by referring to FIG. 3. As the operating unit 300Xa of the engine control device 300X using the idling stop function controls the switch 27X from an off state to an on state to cause electricity to flow in the coil 9X, an electric current G1 is generated in the current system B. The electric current G1 controls the delay circuit 22X and changes the switch 23X from an off state to an on state after a predetermined delay time from the generation of the electric current G1, thereby driving the starter motor 10X.

As a result, as mentioned above, even though the operating unit 300Xa determines the predetermined time from a timing when electricity flows in the coil 9X to a timing when the starter motor 10X is driven according to a monitored ambient temperature of the coil 9X or the electromagnet, there is a problem that the starter motor 10X can be driven at a timing different from an appropriate timing.

Further, as the operating unit 300Xa of the engine control device 300X using the idling stop function controls the switch 28X from an off state to an on state to cause electricity to flow in the starter motor 10X, an electric current G2 is generated in the current system B. Since the electric current G2 causes the delay circuit to be actuated, an erroneous actuation of the starter motor 10X may be caused, as mentioned above.

In this regard, a control circuit for certainly lowering a minimum actuation voltage during the startup of the engine and for preventing the erroneous actuation of the starter motor will be described later.

<First Embodiment>

Hereinafter, the first embodiment of the present invention will be explained.

<Configuration of the Vehicle>

The vehicle of the first embodiment includes an engine as a driving source. The engine is started by the starter system and controlled by the engine control device. The starter system includes a starter motor, a plunger, and a circuit the starter motor and the plunger, and electronic components, etc.

<Starter System>

Figure 4:
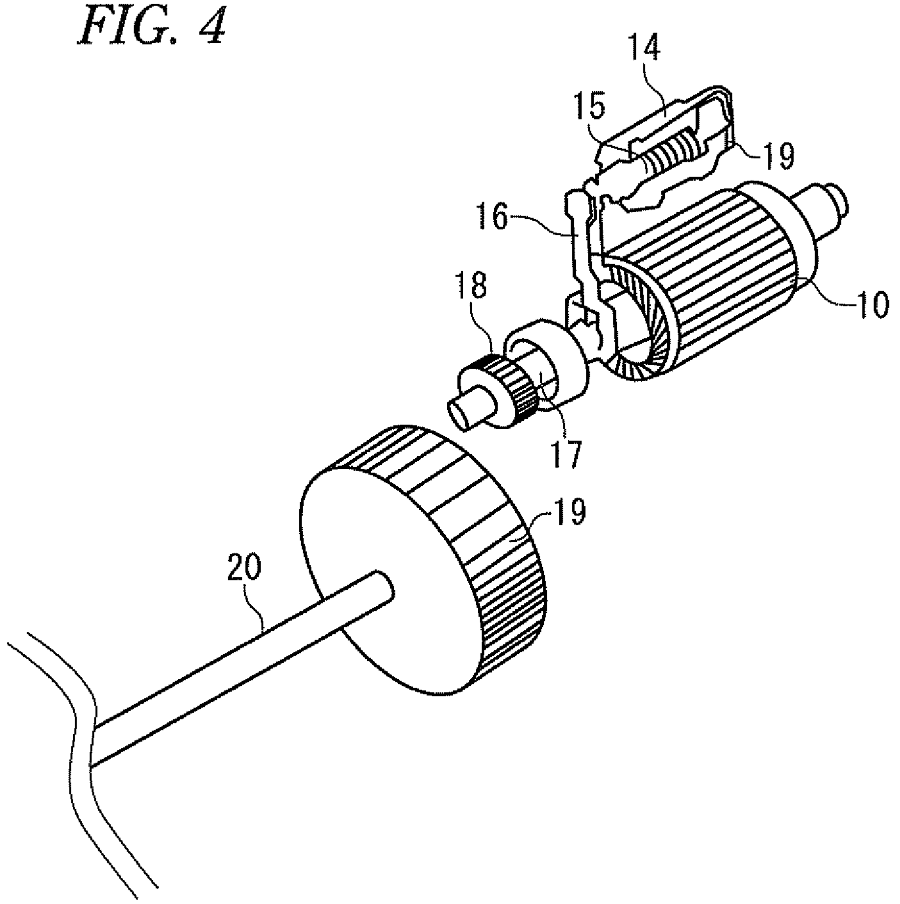
FIG. 4 is a view illustrating a starter system in a first embodiment of the present invention.

As illustrated in FIG. 4, the starter system includes a starter motor 10, a plunger 14, and a coil, an electromagnet and electronic components for controlling the starter motor and the plunger.

As the starter switch 2 is operated by a user and the starting switch 40 is turned on, the starter system controls a drive lever 16 of the plunger 14 to engage a pinion gear 18 provided in an output shaft 17 of the starter motor 10 with a ring gear 19 provided in an output shaft 20 of the engine and to rotationally control the starter motor 10. In this way, the starter motor 10 can be driven.

The drive lever 16 can be controlled in such a way that a starter switch 2 is operated by a user to cause the starting switch 40 to turn on, and thus an electric current is caused to flow from a battery mounted on the vehicle to the coil 9 and an electromagnet 15 opposed to the coil 9 is magnetized. In this way, a magnetized electromagnet 15 can move the drive lever 16 in a direction opposite to the direction of an output shaft of the starter motor 10.

The pinion gear 18 provided on the output shaft 17 of the starter motor 10 is connected to the drive lever 16. And thus, as the drive lever 16 is controlled, the pinion gear moves in the direction opposite to the direction of the output shaft of the starter motor 10 to engage with the ring gear 19 provided in the output shaft 20 of the engine which is located in a position opposite to the starter motor 10.

<Engine Control Device>

The engine control device includes an electronic component such a CPU. The engine control device calculates a control value for controlling an actuator such as an ignition plug, an injector, or a throttle, etc., based on an input value from a sensor detecting a condition of the vehicle, and outputs the control value to the actuator to control the engine.

<System Block Diagram>

A block diagram of the engine control device will be described by referring to FIG. 5.

An idling stop-ECU 100 (Electronic Control Unit) includes an electronic substrate on which electronic components are mounted. For example, the electronic component includes an operating unit 100*a* (for example, CPU), a non-volatile memory 100*b* (for example, ROM) storing a control program, etc., a volatile memory 100*c* (for example, RAM) serving as a working area at the time of calculating is performed, and an input/output unit (I/F) inputting a signal from a sensor or outputting a calculated result to an actuator. The idling stop-ECU serves to perform a startup control of the engine using the idling stop function, which will explained later. The idling stop-ECU 100 is also referred to as an eco-run ECU.

In the meantime, the ENG-ECU 200 also includes an electronic substrate on which electronic components such as an operating unit 200*a*, a non-volatile memory 200*b*, a volatile memory 200*c*, and an input/output unit (I/F) are mounted. The ENG-ECU mainly serves to perform a control of the engine after the engine is started.

The operating unit 100*a* of the idling stop-ECU 100 inputs a signal from a switch or sensor of following (A) to (G) by the input/output unit and calculates a control value for controlling an actuator of following (j) and (K) based on the input signal and the control program stored in the non-volatile memory 100*b*.

(A) an ignition switch 1 (IG-SW) which turns on or off a main relay for starting or ending an electronic system that electronically controls the actuator for travelling the vehicle, that is, an ignition switch for starting or ending a vehicle system.

(B) an accessory switch (ACC-SW) which turns on or off a switch for starting or ending an electronic system that electronically controls vehicle's accessories.

(C) a starter switch 2 (ST-SW) which turns on or off the starting switch 40 for starting or turning off the starter system. This starter switch can be turned on in such a way that a user seating on the seat of the vehicle inserts a key into a predetermined hole and turns the key to a predetermined position.

(D) a detecting unit 3 (vehicle speed sensor) configured to detect a speed of a vehicle.

(E) a temperature detecting unit 4 (a temperature sensor) configured to detect an ambient temperature of the coil 9 or the electromagnet 15 of the starter motor 10. In the meantime, the temperature detecting unit may detect a temperature of the coil 9 or the electromagnet 15. That is, since the coil is wound around the electromagnet without contacting the electromagnet, the temperature of the electromagnet, and the ambient temperature of the coil or the electromagnet is approximately considered as the temperature of the coil.

(F) an acceleration detecting unit 5 (acceleration sensor) configured to detect an operating state of an accelerator performed by a user to accelerate the vehicle speed.

(G) a brake detecting unit 6 (brake sensor) configured to detect an operating state of a brake performed by a user to decelerate the vehicle speed or stop the vehicle.

The operating unit 100*a* of the idling stop-ECU 100 calculates a control value for controlling an actuator of following (J) and (K), based on the signal from a switch or sensor of above (A) to (G) and the control program stored in the non-volatile memory 100*b* and outputs the calculated control value from the input/output unit.

(J) a coil 9 in the starter system.

(K) a starter motor in the starter system.

The operating unit 200*a* of the ENG-ECU 200 inputs a signal from a switch or sensor of following (H) and (I) by the input/output unit and calculates a control value for controlling an actuator of following (L) to (N) based on the input signal and the control program stored in the non-volatile memory 100*b*.

(H) a crank angle detecting unit 7 (crank angle sensor) configured to detect a rotation speed of the engine or to detect a cylinder to be exploded by an ignition plug and an injector when the cranking control of the engine is performed.

(I) a cam angle detecting unit 8 (cam angle sensor) configured to detect a cylinder to be exploded by an ignition plug or an injector when the cranking control of the engine is performed.

The operating unit 200*a* of the ENG-ECU 200 calculates a control value for controlling an actuator of following (L) to (N), based on the signal from a switch or sensor of above (H) and (I) and the control program stored in the non-volatile memory 200*b* and outputs the calculated control value from the input/output unit.

(L) an ignition unit 11 (ignition plug) configured to ignite the air and fuel introduced in the cylinder of the engine.

(M) a fuel injecting unit 12 (injector) configured to inject a necessary fuel into a cylinder of the engine to be exploded.

(N) an intake unit 13 (throttle) configured to inhale an air into a cylinder of the engine to be exploded.

The idling stop-ECU 100 and the ENG-ECU 200 inputs/outputs the input signal or the calculated result from a common input/output unit by a telecommunication unit or a vehicle mounted network which communicates the idling stop-ECU and the ENG-ECU to each other.

Figure 6:
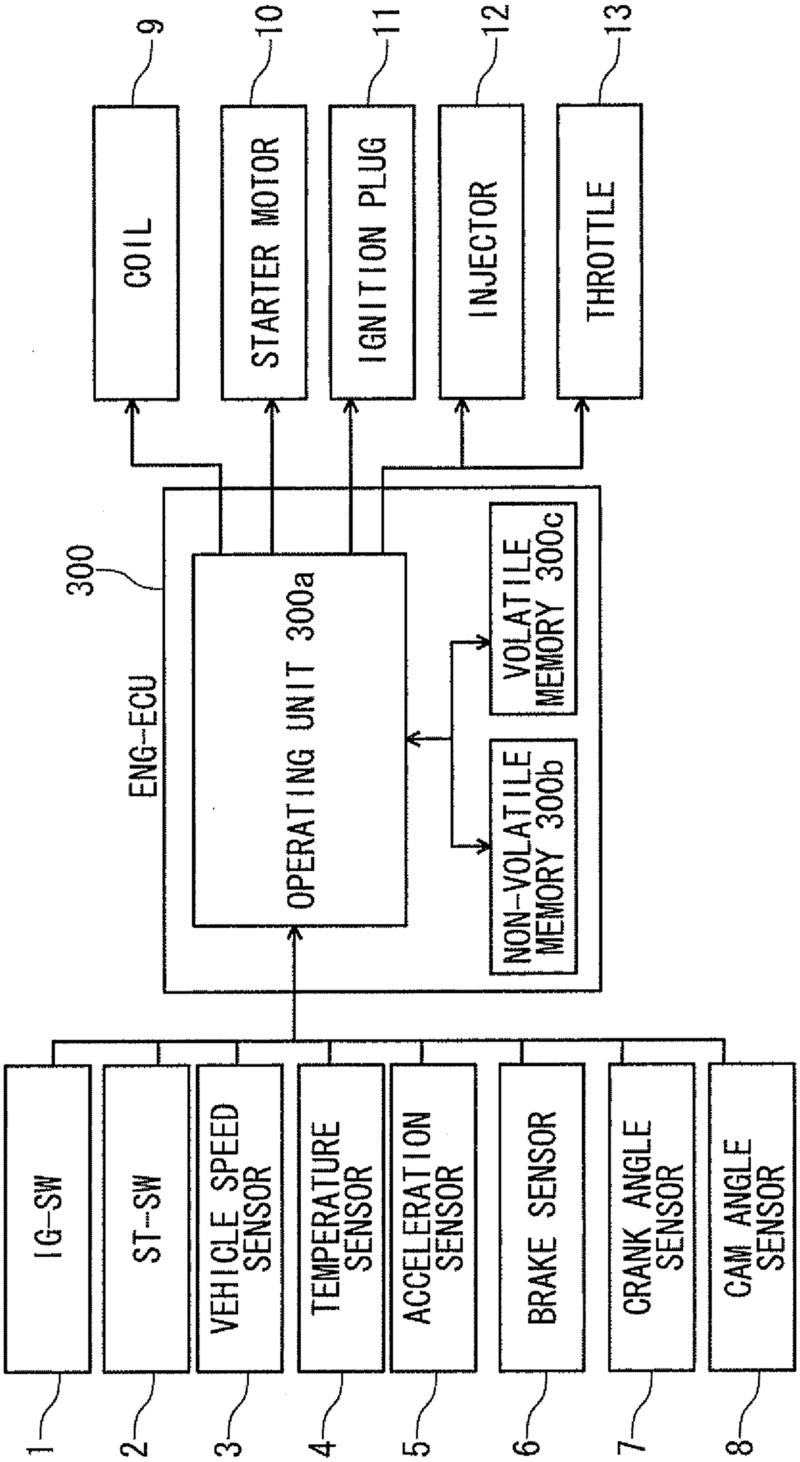
FIG. 6 is a block diagram for explaining an engine control device in the first embodiment.

Meanwhile, as in the ENG-ECU 300 shown in the FIG. 6, it is also preferable that a signal from all the switches or sensors of above (A) to (I) may be input and control values for controlling all the actuators of above (J) to (N) may be output.

Figure 5:
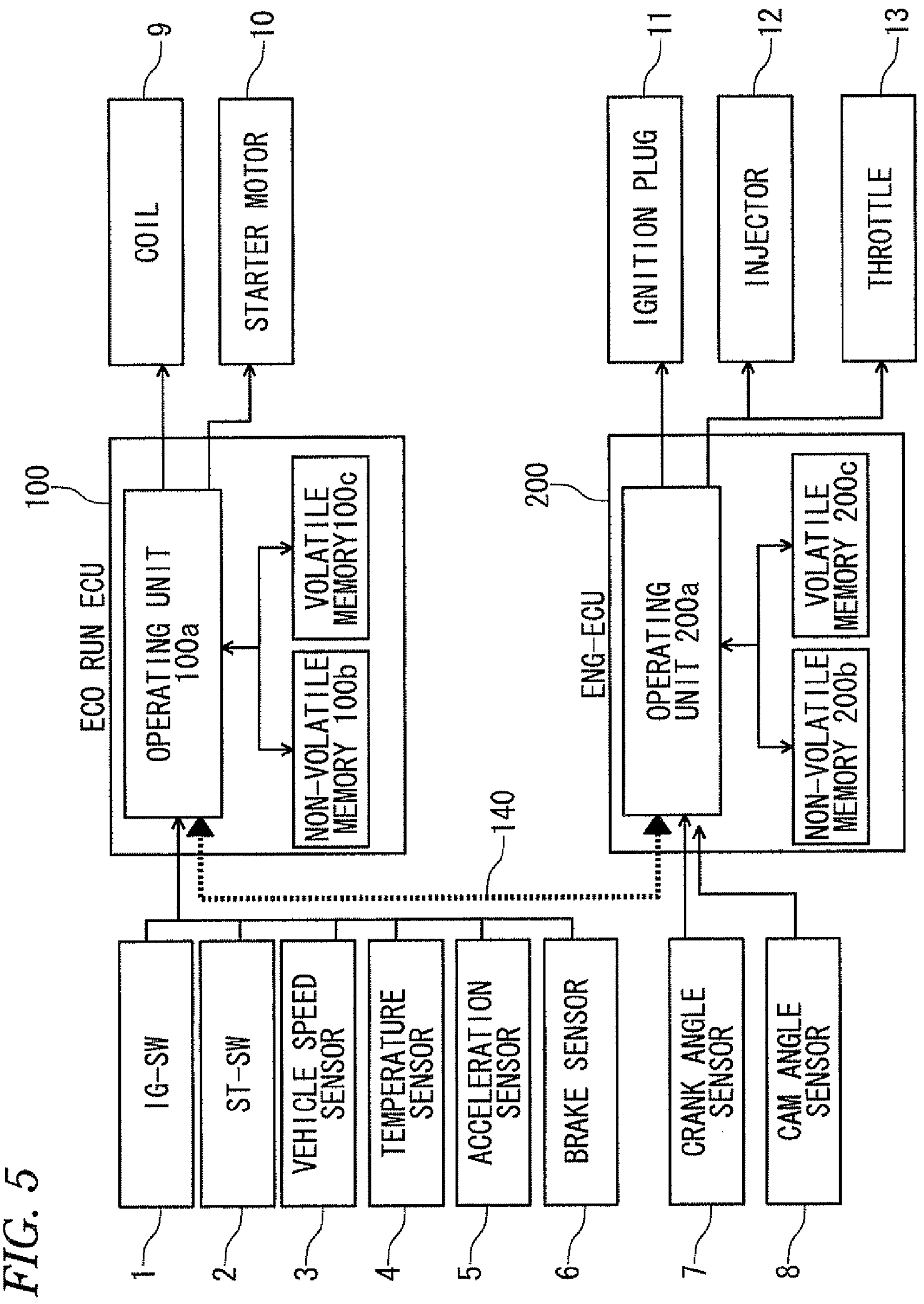
FIG. 5 is a block diagram for explaining an engine control device in the first embodiment.

Since the functions of the idling stop-ECU 100 and the ENG-ECU 200 shown in FIG. 5 can be realized by one ENG-ECU shown in FIG. 6, a combination of the idling stop-ECU 100 and the ENG-ECU 200 shown in FIG. 5 may be referred to as engine control device 300.

<Startup Control of Engine by Turning on Starting Switch>

A startup control of an engine will be described when a starter switch 2 is operated by a user to turn on a starting switch 40.

When a starter switch 2 is operated by a user to turn on a starting switch 40, the starter system is controlled by a hardware control. That is, the driving of the starter motor 10X can be controlled by causing the electric current to flow in the coil 9 to control the plunger 14 and then engaging the pinion gear 18 of the starter motor 10 and the ring gear 19 of the engine to each other.

The operating unit 300*a* of the engine control device 300 performs a cranking control of the engine when a starter switch 2 is operated by a user to turn on a starting switch 40. When the cranking control of the engine is performed, since the operating unit 300*a* of the engine control device 300 cannot perform the cranking control only by a rotation of the engine until the rpm of the engine reaches a predetermined rpm (1500 rpm), the starter motor 10 driven by the starter system can assist the rotation of the engine.

The engine is a four-cycle four-cylinder engine. The operating unit 300*a* of the engine control device 300 selects two cylinders of the four cylinders of which piston is in a top-dead center, based on the input signal from the crank angle detecting unit 7. Of the selected two cylinders, one cylinder to be ignited or to be fuel injected is further selected based on the input signal from the cam angle detecting unit 8. And then, a control signal is outputted to an ignition unit 11 or a fuel injection unit 12 of the selected cylinder to cause the cylinder to be exploded. After the cylinder to be exploded is selected, the cylinder to be exploded is determined based on an input signal from the crank angle detecting unit 7 and a predetermined sequence and then an explosion of the determined cylinder is performed. Such a control is repeatedly performed. In the meantime, the engine may be three-cylinder or six-cylinder engine. Further, in this case, the cranking control of the engine can be performed by the operating unit, based on the input signal from the crank angle detecting unit or the cam angle detecting unit.

A user inserts a key into a predetermined hole and turns the inserted key to the position of the switch 2. And, after the user listens to an engine noise and determines that the rpm of the engine reaches a predetermined rpm, the user returns the key turned to the position of the switch 2 to a position in which the ignition switch 1 is turned on. By doing so, the starting switch 40 is turned from an on state to an off state and the electric current flowing from the power source to the starter system is cut off, and thus the starter system is stopped.

(Control Circuit)

A control circuit for performing a startup control of an engine will be described by referring to FIG. 8 when the starter switch 2 is operated by a user to turn on the starting switch 40.

(Current System A)

In a vehicle, a current system A is provided to cause an electricity to flow from a power source 26 installed in the vehicle to a ground part 21. In the current system A, the starting switch 40 and the coil 9 are provided from the power source side.

By operating the starter switch 2 by a user, the starting switch 40 of a starter system is turned from an off state to an on state. As the starting switch 40 is turned from an off state to an on state, electricity is caused to flow in the current system A from the power source 26 to the ground part 21.

As a result, electricity is caused to flow in the coil 9 to control the plunger 14 and thus the pinion gear 18 of the starter motor 10 and the ring gear 19 of the engine are engaged to each other.

(Current System B)

Next, in the vehicle, a current system B is branched from between the starting switch 40 and the coil 9 in the current system A to cause electricity to flow to the ground part 25 via the engine control device 300.

In the current system B inside the engine control device 300, a switch 33 (bipolar transistor) which is configured to cutoff or to allow the electric current flowing from the current system A to the current system 13 by being turned off or on and a delay circuit 22 which is configured to input the electric current flowing to the current system A and to control the switch 33 from an off state to an on state at a timing delayed from the input operation are provided. Further, in the current system B causing the electric current to flow to the ground part 25 via the engine control device 300, a starter motor 10 is provided between the engine control device 300 and the ground part 25.

By this configuration, since the electric current is branched from the current system A and temporarily flows to the engine control device 300 when the electric current flows in the current system A, the delay switch 22 inside the engine control device 300X can delay the flow of the electric current to a downstream side from the switch 33.

As a result, by causing the electric current flowing in the current system A to flow to the current system B at a delayed timing, the starter motor 10 can be driven after the pinion gear 18 of the starter motor 10 and the ring gear 19 of the engine are engaged with each other at a timing when both gears are in a static state. Accordingly, the engine can be started while preventing an abnormal noise being occurred.

<Startup Control of Engine Using Idling Stop Function>

Hereinafter, the startup control of the engine using the idling stop function will be explained.

The startup control of the engine using the idling stop function indicates an engine control for improving fuel consumption. Specifically, in a time interval from a timing when a user operates the starter switch 2 to turn on the starting switch 40, thereby turning on the engine to a timing when a user operates the ignition switch 1 to an off state, thereby turning off the engine, the engine is stopped when a condition (engine stop condition) such as a stop of the vehicle is satisfied and the engine is started when a condition (engine start condition) such as an acceleration operation by a user is satisfied.

Further, as the idling stop function, an idling stop function for stopping an idling stop function for decelerating may be used.

(Startup Control of Engine Using Idling Stop Function for Stopping)

First, the startup control of the engine using the idling stop function for stopping will be described.

(Stop Control of Engine)

The operating unit 300*a* of the engine control device 300 stops the engine in a case where the conditions (stop conditions of the engine) of following (1) to (6) are satisfied.

(1) The operating unit 300*a* determines that the vehicle speed is zero, based on an input signal from the vehicle speed detecting unit 3.

(2) The operating unit 300*a* determines that the accelerator is not operated, based on an input signal from the acceleration detecting unit 5.

(3) The operating unit 300*a* determines that the brake is operated, based on an input signal from the brake detecting unit 6.

(4) The operating unit 300*a* determines that a shift lever is in a drive mode, based on an input signal from a shift lever detecting unit.

(5) The operating unit 300*a* determines that a capacity of the batter is lower than a predetermined level, based on an input signal from a detecting unit for detecting the capacity a battery as a power source. At this time, it is also possible to input a determined result determined by other control device.

(6) It is determined that there is not a state where an idle control should be maintained by other control.

At this time, a condition for the stop control of the engine using the idling stop function is not limited to the above conditions. That is, as long as the purpose of the idling stop function is matched, various conditions may be added or any one of the conditions may be omitted.

The operating unit 300*a* stops the engine in a case where the stop conditions of the engine of above (1) to (6) are satisfied. The stop control of engine using the idling stop function is realized by stopping the ignition unit 11, the fuel injection unit 12 and the intake unit 13 and thus causing the rpm of the engine to zero.

(Startup Control of Engine)

The operating unit 300*a* of the engine control device 300 causes the engine to start up in a case where the conditions (startup conditions of the engine) of following (7) to (9) are satisfied.

(7) The operating unit 300*a* determines that the accelerator is operated from the idle strop state, based on an input signal from the acceleration detecting unit 5.

(8) The operating unit 300*a* determines that the brake is not operated, based on an input signal from the brake detecting unit 6.

(9) The operating unit 300*a* determines that a shift lever is in a drive mode, based on an input signal from a shift lever detecting unit.

In the meantime, a condition for the startup control of the engine using the idling stop function is not limited to the above conditions. That is, as long as the purpose of the idling stop function is matched, various conditions may be added or any one of the conditions may be omitted.

The operating unit 300*a* of the engine control device 300 cooperates with the control circuit to control the drive lever 14 and to drive the starter motor 10. At this time, when the operating unit determines that the rpm of the engine reaches a predetermined rpm, based on the input signal from the crank angle detecting unit 7, a rotation assist by starter motor 10 is not necessary. Accordingly, the control of the plunger 14 and driving of the starter motor 10 are stopped.

(Startup Control of Engine Using Idling Stop Function for Decelerating)

Next, the startup control of the engine using the idling stop function for decelerating will be described.

(Stop Control of Engine)

The operating unit 300*a* of the engine control device 300 stops the engine in a case where the conditions (stop conditions of the engine) of following (1) to (5) are satisfied.

Figure 7:
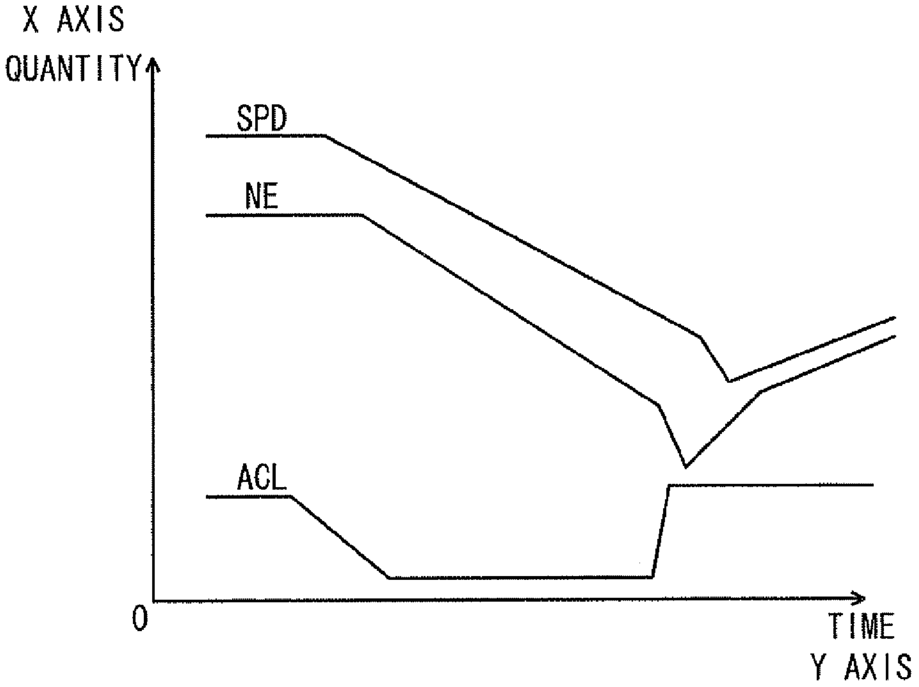
FIG. 7 is a chart view illustrating a vehicle speed of a vehicle, an rpm of an engine, and a timing of acceleration operation.

(1) The operating unit 300*a* determines that the vehicle speed is equal to or lower than a predetermined speed, based on an input signal from the vehicle speed detecting unit 3. For example, as shown in FIG. 7, it is determined that the vehicle speed SPD is equal to or lower than 5 km/h, in a case where the time in Y-axis advances and the vehicle speed in X-axis is decelerated.

(2) The operating unit 300*a* determines that the rpm of the engine is equal to or lower than a predetermined rpm, based on an input signal from the crank angle detecting unit 7. For example, as shown in FIG. 7, it is determined that the rpm NE of the engine is equal to or lower than 700 rpm, in a case where the time in Y-axis advances and the rpm NE of the engine in X-axis is decreased.

(3) The operating unit 300*a* determines that a shift lever is in a drive mode, based on an input signal from a shift lever detecting unit.

(4) The operating unit 300*a* determines that a capacity of the batter is lower than a predetermined level, based on an input signal from a detecting unit for detecting the capacity a battery as a power source. At this time, it is also possible to input a determined result determined by other control device.

(5) It is determined that there is not a state where an idle control should be maintained by other control.

At this time, a condition for the stop control of the engine using the idling stop function is not limited to the above conditions. That is, as long as the purpose of the idling stop function is matched, various conditions may be added or any one of the conditions may be omitted.

The operating unit 300*a* stops the engine in a case where the stop conditions of the engine of above (1) to (5) are satisfied. The stop control of engine using the idling stop function is realized by stopping the ignition unit 11, the fuel injection unit 12 and the intake unit 13 and thus causing the rpm of the engine to zero.

(Startup Control of Engine)

The operating unit 300*a* of the engine control device 300 causes the engine to start up in a case where the conditions (startup conditions of the engine) of following (6) to (8) are satisfied.

(6) The operating unit 300*a* determines that the accelerator is operated from the idle strop state, based on an input signal from the acceleration detecting unit 5.

(7) The operating unit 300*a* determines that the brake is not operated, based on an input signal from the brake detecting unit 6.

(8) The operating unit 300*a* determines that a shift lever is in a drive mode, based on an input signal from a shift lever detecting unit.

At this time, a condition for the startup control of the engine using the idling stop function is not limited to the above conditions. That is, as long as the purpose of the idling stop function is matched, various conditions may be added or any one of the conditions may be omitted.

The operating unit 300*a* of the engine control device 300 cooperates with the control circuit to control the drive lever 14 and to drive the starter motor 10. At this time, when the operating unit determines that the rpm of the engine reaches a predetermined rpm, based on the input signal from the crank angle detecting unit 7, a rotation assist by starter motor 10 is not necessary. Accordingly, the control of the plunger 14 and driving of the starter motor 10 are stopped.

(Current System C)

A control circuit for controlling a startup of the engine using the idling stop function will be described by referring to FIG. 8.

The operating unit 300*a* installed in the engine control device 300 controls the startup of the engine using the idling stop function mentioned above.

A current system C is provided in the vehicle to extend from a power source 31 as a second power source installed in the engine control device 300 and to join with a portion upstream from the delay circuit 22 and the switch 33 of the current system B installed in the engine control device 300, thereby causing electricity to flow from the current system B downstream of the joined portion to the ground part 21. In the current system C, the power source 31 side is provided in the engine control device 300 and the ground part 21 side is provided in the vehicle. Further, a coil 9 is provided in the ground part side of the current system C. That is, in the current system C, a portion of the ground part 21X side provided in the vehicle is commonly used as a portion of the current system A or the current system B.

Further, in the current system C, a portion of the power source 31 side provided in the engine control device 300 includes a switch 27 as a first switch which allows or cuts off the electric current flowing from the power source 31 to the ground part 21 by being turned on or off. In addition, a diode 29 for preventing the back-flow of the electric current to the power source 31 is provided between the switch 33 and the joined part in the current system C.

By causing the operating unit 300*a* of the engine control device 300 to turn on or off the switch 27 and thus to allow or cut off the electric current flowing from the power source 31 to the ground part 21, the flow of the electric current to the coil 9 in the current system C can be controlled.

Figure 2:
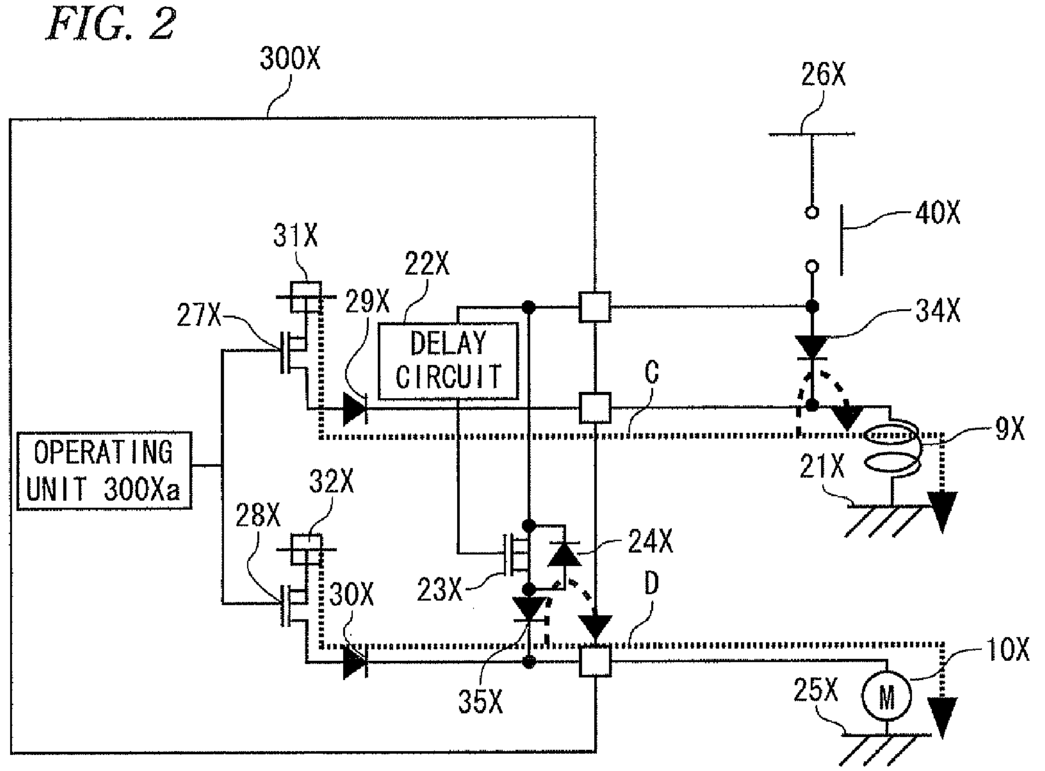
FIG. 2 is a circuit diagram for explaining an engine control device and a starter system.

In the meantime, the diode 34X which is explained regarding to FIG. 2 is not provided in the current system C. The delay circuit 22 is configured to delay the flow of the electric current in the current system B. A signal line branched from between the operating unit 300*a* and the switch 27 in the current system C and a signal line branched from the diode 29 to a downstream side thereof in the current system C are taken in the delay line 22. These signal lines are monitor lines to monitor whether the starting switch 40 is turned from an off state to an on state to cause electricity to flow in the current system B or the operating unit 300*a* turns, the switch 27 from an off state to an on state to cause electricity to flow in the current system B. The delay circuit 22 can determine by the operation of the logic circuit whether the electricity flows through either of the signal lines, based on a signal from the monitor line taken in the delay circuit. When it is determined that the starting switch 40 is turned from an off state to an on state to cause the electricity to flow in the current system B, the electricity is caused to flow in the current system B upstream from the switch 33 and then delayed, and the switch 33 is turned from an off state to an on state to cause the electricity to flow to the ground part 25, and then the starter motor 10 can be driven. When it is determined that the operating unit 300*a* turns the switch 27 from an off state to an on state to cause electricity to flow in the current system B, the switch 33 is maintained in an off state without being turned on.

That is, the delay circuit 22 causes electricity to flow in the coil 9 only when the starter switch 2 is operated by a user to turn the starting switch 40 from an off state to an on state. And then, the delay circuit 22 delays the electricity and then drives the starter motor 10. In other words, even if the operating unit 300*a* causes electricity to flow in the coil 9 by using the idling stop function and thus causes the electricity to flow in the delay circuit 22, the startup of the engine is controlled by the operating unit 300*a*. Accordingly, the switch 33 is not turned from an off state to an on state by the delay circuit 22.

Meanwhile, the switch 33 is controlled by determining whether the delay circuit 22 delays the flow of electricity or not, to control the switch 33 and also the switch 33 has a function to cut off or allow the flow of electricity, based on an instruction from the delay circuit 22. Accordingly, it is considered that these elements may be included as a portion of a delay unit.

Such a logic configuration of the delay circuit 22 will be described in detail later.

The operating unit 300*a* provided in the engine control device 300 cooperates with the above control circuit to perform a startup control of the engine. When it is determined that the engine start condition in the idling stop function is satisfied, the electric current is caused flow in the coil 9 and is delayed by a delay time, and then the starter motor is driven. At this time, the operating unit 300*a* calculates the delay time according to a detecting temperature of the temperature detecting unit 4. For example, in this calculation, a map of a temperature stored on a non-volatile memory 300*b* in advance and the delay time is used as a reference. The operating unit 300*a* controls the switch 27 from an off state to an on state, and after the delay time, controls the switch 28 from an off state to an on state.

(Current System D)

A current system D is provided in engine control device 300 to extend from a power source 32 as a third power source installed in the engine control device 300 and to join with a part of the current system B downstream from the switch 23 in the engine control device 300, thereby causing electricity to flow to the ground part 25 of the vehicle. That is, in the current system D, a portion of the ground part 25 side provided in the vehicle is commonly used as a portion of the current system B.

Further, in the current system D, a switch 28 as a second switch which allows or cuts off the electric current flowing from the power source 32 to the ground part 25 by being turned on or off is provided. In addition, a diode 30 for preventing the back-flow of the electric current to the power source 32 is provided in a portion of the current system D between the switch 28 and the joined part.

By causing the operating unit 300*a* of the engine control device 300 to turn on or off the switch 28 and thus to allow or cut off the electric current flowing from the power source 32 to the ground part 25, the flow of the electric current to the starter motor 10 in the current system D can be controlled.

In the meantime, when the switch 33 is constituted by a bipolar transistor switch, the diode 35X mention above is not provided in the current system B. The reason is that the back-flow of electricity is not occurred as the switch 33 is changed from the MOS transistor switch to the bipolar transistor.

In addition, when the switch 33 is constituted by the MOS transistor switch, a back-flow of electricity can be occurred unless the diode for prevention the back-flow of electricity is provided in the vicinity of the switch. However, since the delay circuit 22 has a function as mentioned above, the malfunction of the switch 33 is not occurred even if the electricity flows into the delay circuit.

Since the delay circuit 22 having such a function is employed, the diode 34X and the diode 35X can be omitted, and thus it is possible to save manufacturing cost. In addition, it is possible to assure a minimum actuation voltage in a lower level when the engine is started.

When it is determined that the engine start condition in the idling stop function is satisfied, the operating unit 300*a* provided in the engine control device 300 cooperates with such a control circuit to cause the electric current to flow in the coil 9 and to delay the electric current by a predetermined time, and then to turn on the switch 28 from an off state to an on state to drive the starter motor 10.

Herein, a system of electricity flowing from a battery as a main power source to the coil 9 is referred to a first current system and a system of electricity flowing from a battery as a main power source to the starter motor 10 is referred to a second current system. Accordingly, the current system A and the current system C are referred to as the first current system and the current system B and the current system D are referred to as the second current system.

(Delay Circuit)

The details of the delay circuit 22 having such a function will be described by referring to FIG. 9.

In order to detect whether electricity is caused to flow in a position upstream from the switch 33 in the current system B provided in the engine control device 300 or not, a resistance T1 is provided at the position. Two connecting lines which connect both ends of the resistance T1 are connected to the comparator CP1. The two connecting lines are respectively provided with a resistance T2 and a resistance T3 to suppress the value of the electric current in a suitable value as compared to the electric current in the comparator CP1. One of the two connecting lines is connected to a minus part of the comparator CP1. Further, one end of the power source D2 of which other end is connected to a ground is connected to the one connecting line. At this time, the power source D2 has a comparative voltage value. In addition, the one end extends to be connected to NOT circuit NT3 which, in turn, is connected to a reset part of the flip-flop circuit FF. The comparator CP1 is connected to the chopping circuit CHP.

That is, when electricity is caused to flow in the current system B, the control signal HI is caused to flow through the one connecting line and converted to the control signal LOW by the NOT circuit NT3, and the control signal LOW is input into the reset part of the flip-flop circuit FF. In contrast, when electricity is not caused to flow in the current system B, the control signal HI is input into the reset part.

One of two connecting lines is connected to a plus part of the comparator CP1. The comparator CP1 considers an electric current input from the one connecting line as a reference voltage and compares the reference voltage and an electric current in other connecting line. The comparator CP1 outputs a control signal FIT to a chopping circuit CHP when the voltage of the electric current input into the plus part thereof exceeds the reference voltage input into the minus part thereof. The chopping circuit CHP is connected to the NOT circuit NT1.

Accordingly, it is considered that electricity is caused to flow in the current system B when the voltage in the current system B exceeds the reference voltage, and the above action serves to control the starter motor 10.

The chopping circuit CHP chops the control signal HI in a predetermined cycle and outputs the chopped control signal. This is for the purpose of preventing the switch 33 from being thermally broken due to an over-current during a load short.

Further, a connecting line of two connecting lines is branched from a connecting line input into the minus part of the comparator CP1 and connected to the plus part of the comparator CP2. Further, one end of the power source D1 of which other end is connected to a ground is connected to minus part of the comparator CP2. At this time, the power source D1 has a comparative voltage value.

The branched connecting line is provided with a resistance T4 to suppress the value of the electric current in a suitable value and one end of a capacitor CD of which is connected to a ground is connected to downstream of the resistance. That is, when electricity is caused to flow in the current system B, electricity is caused to flow in the branched connecting line and suppressed by the resistance T4. And thus, electricity is accumulated in the capacitor CD. When the capacity of the accumulated electricity exceeds the storage capacity of the capacitor CD, electricity begins to flow in the comparator CP2.

The comparator CP2 compares the voltage input in the plus part and the reference voltage put in the minus part. The comparator CP2 is connected to the flip-flop circuit FF and outputs a control signal HI to the flip-flop circuit FF when the voltage of the electricity flowing in the comparator CP2 exceeds the reference voltage.

Accordingly, it can be said that such an action serves to delay the flow of electricity in the current system B.

As mentioned above, since the flip-flop circuit FF is not reset when electricity is caused to flow in the current system B, the control signal HI input from the comparator CP2 is converted to output control signal LOW to NOR circuit NR1 which is connected to the flip-flop circuit FF.

A control line which causes the operating unit 300*a* to control the switch 27, that is, a control line which is branched from a control line connecting the operating unit 300*a* and the switch 27 is connected to the NOR circuit NR1. In a case where the startup control of the engine is performed by operating the starter switch 2 by a user and thus turning the starting switch 40 from an off state to an on state, in other words, in a case where the startup control of the engine is not performed by the operating unit 300*a* using the idling stop function, the control signal LOW is input to the NOR circuit NR1. In contrast, in a case where the startup control of the engine is not performed by operating the starter switch 2 by a user and thus turning the starting switch 40 from an off state to an on state, in other words, in a case where the startup control of the engine is performed by the operating unit 300*a* using the idling stop function, the control signal HI is input to the NOR circuit NR1.

That is, NOR circuit NR1 outputs the control signal HI, in a case where electricity is caused to flow in the current system B and the operating unit 300*a* does not output the control signal HI, in other words, in a case where the startup control of the engine is performed by operating the starter switch 2 by a user and thus turning the starting switch 40 from an off state to an on state and where the startup control of the engine is not performed by the operating unit 300*a* using the idling stop function.

Further, NOR circuit NR1 outputs the control signal LOW, in a case where electricity is caused to flow in the current system B and the operating unit 300*a* outputs the control signal HI, in other words, in a case where the startup control of the engine is not performed by operating the starter switch 2 by a user and thus turning the starting switch 40 from an off state to an on state and where the startup control of the engine is performed by the operating unit 300*a* using the idling stop function.

Accordingly, such an action serves to determine whether the startup control of the engine is performed by operating the starter switch 2 by a user and thus turning the starting switch 40 from an off state to an on state, or the startup control of the engine is performed by the operating unit 300*a* using the idling stop function.

The NOR circuit NR1 is connected to the NOT circuit NT2 which, in turn, is connected to the NOR circuit NR2. NOR circuit NR2 is joined with the buffer circuit 131 which, in turn, is connected to the switch 33. As the NOR circuit NR1 outputs the control signal HI, the control signal HI is converted by the NOT circuit NT2 to output the control signal LOW to the NOR circuit NR2. In contrast, as the NOR circuit NR1 outputs the control signal LOW, the control signal LOW is converted by the NOT circuit NT2 to output the control signal HI to the NOR circuit NR2.

Only when the control signal LOW is input from the NOT circuit NT1 and the control signal LOW is input from the NOT circuit NT2, the NOR circuit NR2 outputs the control signal HI to the buffer circuit 131 and controls the switch 33 from an off state to an on state.

That is, the NOR circuit NR2 outputs the control signal HI to the buffer circuit B1 and controls the switch 33 from an off state to an on state to drive the starter motor 10, in a case where the starter switch 2 is operated by a user and thus the starting switch 40 is turned from an off state to an on state to perform the startup control of the engine, and where the startup control of the engine is not performed by the operating unit 300*a* using the idling stop function, and only at a timing when the chopping circuit CHP is chopping the control signal HI.

Figure 9:
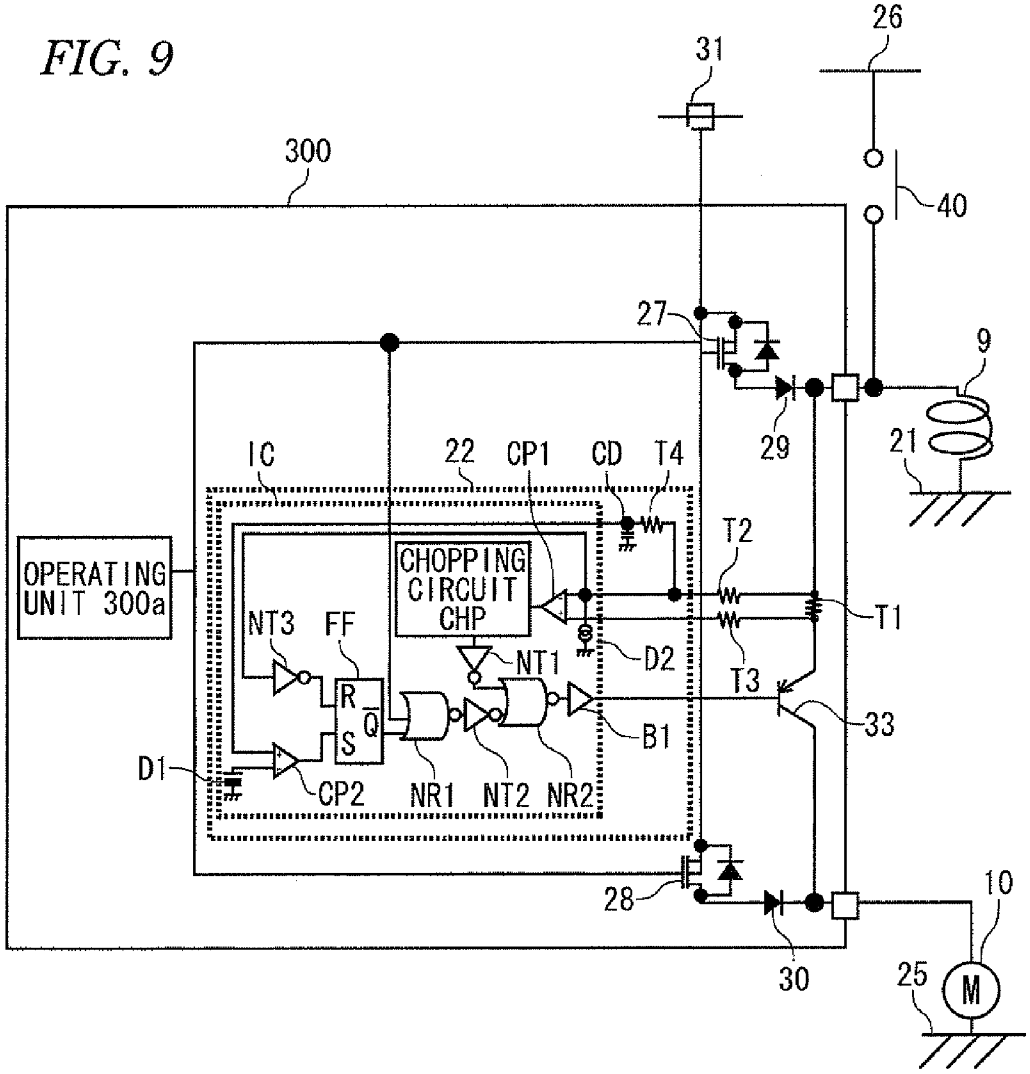
FIG. 9 is a circuit diagram for explaining an engine control device and a starter system in the first embodiment.

In the meantime, a part of the delay circuit shown in FIG. 9 other than the capacity CD or the resistance T4 which is a delay part of the delay circuit is constituted by integrated circuit IC.

By employing such a configuration, the following effects can be obtained.

By employing the hardware control and the software control in which the electricity is caused to flow in the coil 9 and then the starter motor 10 is driven, it is possible to prevent occurrence of the abnormal noise during a startup control of the engine.

Since the starter system is controlled by the hardware control which has a lower failure as compared to the software control when the starter switch 2 is operated by a user, it is possible to prevent a faculty startup of the engine when the starter switch 2 is operated by a user.

When the starter switch is operated by a user and thus the starting switch is turned on to control the startup of the engine, the engine is started by using the hardware control as a base. And when the startup of the engine is controlled by the idling stop function, the engine is started by using the software control as a base. Accordingly, it is possible to rapidly realize the startup performance of the engine and to reliably improve the startup performance of the engine when a startup control of the engine is performed by the idling stop function.

In a case that the startup of the engine is performed by the hardware control, the delay circuit 22 serves to delay a flow of electricity. And, in a case that the startup of the engine is performed by the software control, the delay circuit 22 serves to cut off a flow of electricity. Accordingly, it is possible to assure a minimum actuation voltage in a lower level when the engine is started. In addition, since the diode can be omitted, it is possible to save manufacturing cost.

MODIFIED EXAMPLE

Hereinabove, although the first embodiment of the present invention is described, the present invention is not limited to the first embodiment and various modifications can be considered. Hereinafter, the modified example of the first embodiment will be described. Of course, it is also preferable to various combine the configurations described in below paragraph.

Modified Example 1

Figure 10:
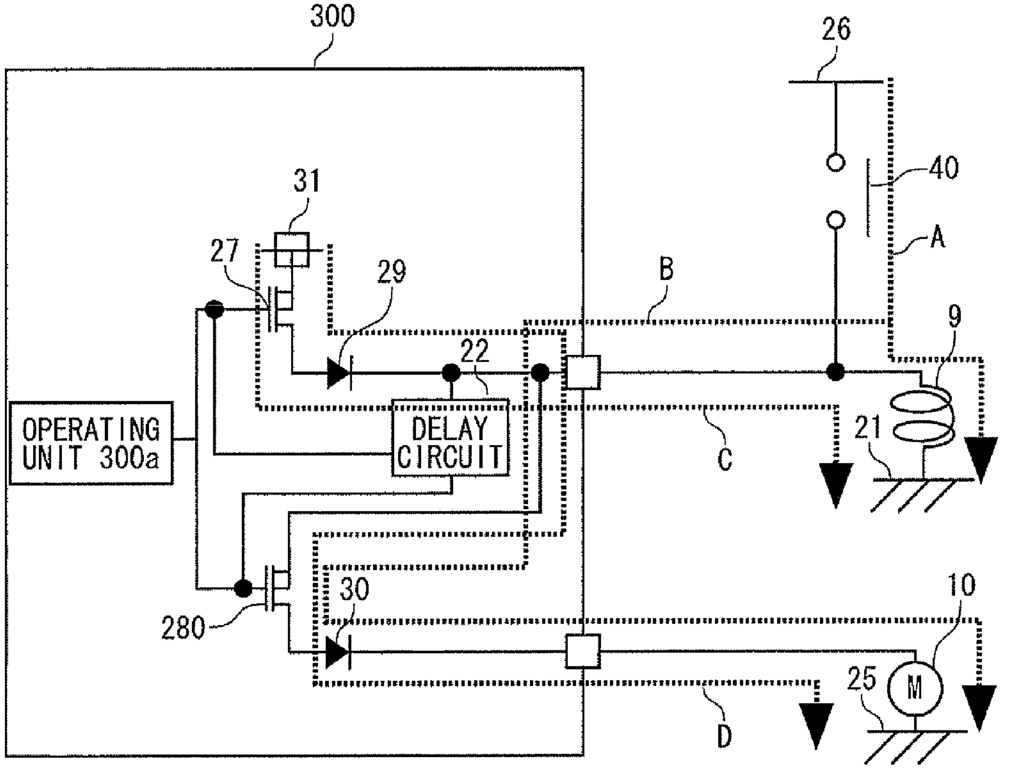
FIG. 10 is a circuit diagram for explaining an engine control device and a starter system in the modified example 1 of the first embodiment.

The modified example 1 of the first embodiment will be described by referring to FIG. 10. In particular, the difference with the first embodiment shown in FIG. 8 will be mainly explained.

Figure 8:
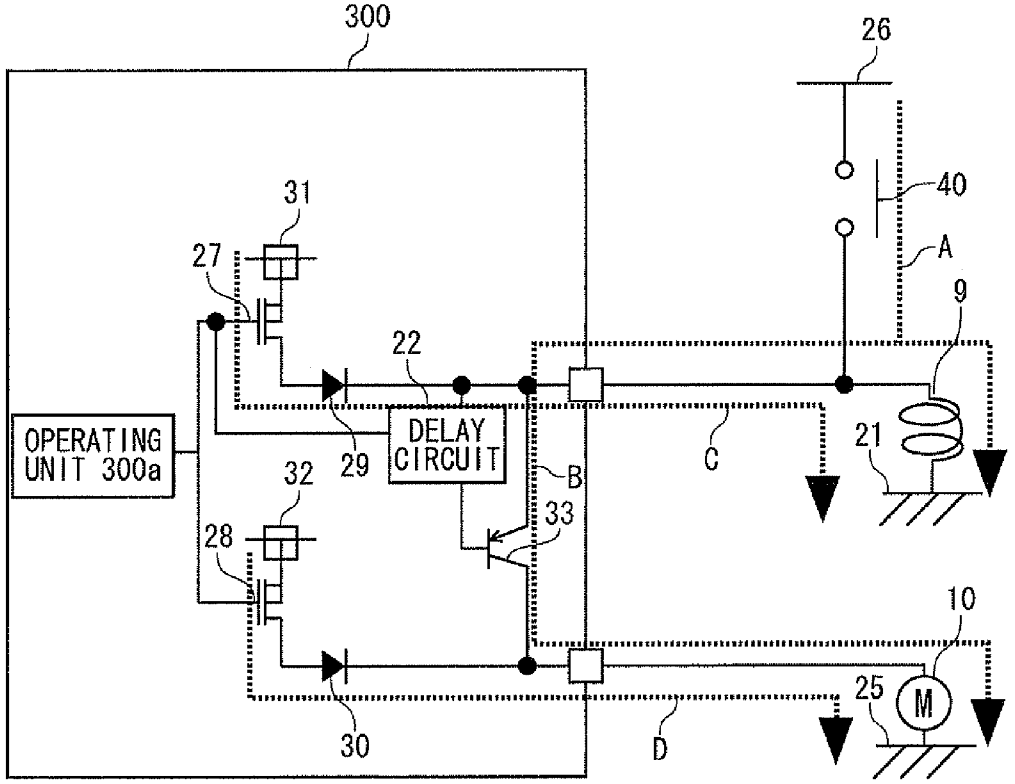
FIG. 8 is a circuit diagram for explaining an engine control device and a starter system in the first embodiment.

In the modified example 1, the switch 33 indicated as bipolar transistor switch and the power source 32 provided in the first embodiment shown in FIG. 8 are omitted.

In the modified example 1, the switch 33 indicated as bipolar transistor switch and the switch 28 indicated as MOS transistor switch in FIG. 8 are realized by one MOS transistor switch 280. A control line of the operating unit 300*a* and the delay circuit 22 for controlling the MOS transistor switch 280 is connected to the MOS transistor switch 280.

In the modified example 1, the power source 32 provided in the engine control device 300 in FIG. 8 is omitted and a power source 31 is employed. The current system D is configured to cause electricity to flow from the power source 31 to the ground part 25 via a portion of the current system 13 and the current system C.

According to the modified example 1, it is possible to achieve the same effect as the first embodiment. In addition, one switch and one power source can be omitted as compared to the first embodiment to save manufacturing cost.

Modified Example 2

Figure 11:
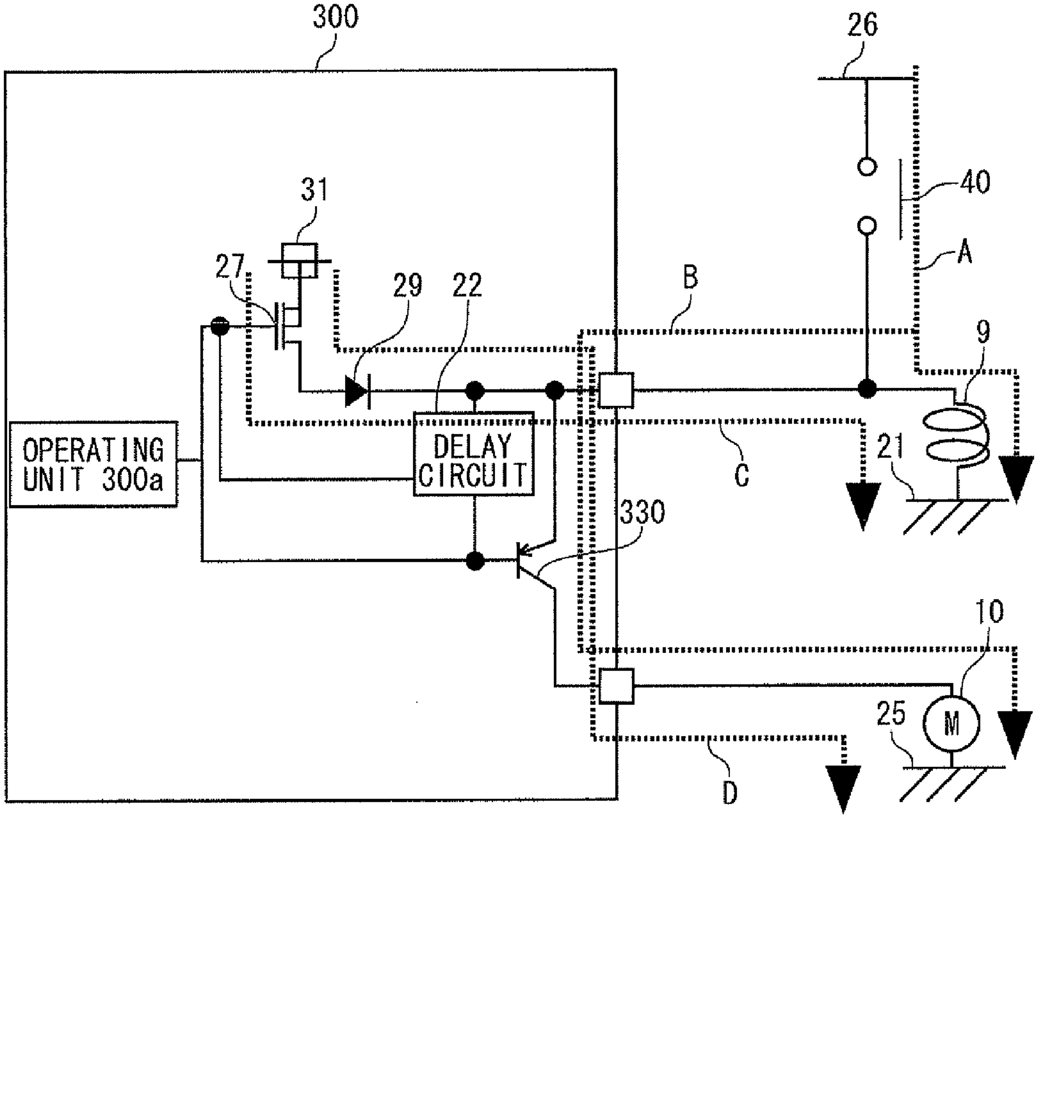
FIG. 11 is a circuit diagram for explaining an engine control device and a starter system in the modified example 2 of the first embodiment.

The modified example 2 of the first embodiment will be described by referring to FIG. 11. In particular, the difference with the first embodiment shown in FIG. 8 will be mainly explained.

In the modified example 2, the switch 28 indicated as MOS transistor switch, the power source 32 and the diode 30 provided in the first embodiment shown in FIG. 8 are omitted.

In the modified example 2, the switch 33 indicated as bipolar transistor switch and the switch 28 indicated as MOS transistor switch in FIG. 8 are realized by one bipolar transistor switch 330. A control line of the operating unit 300*a* and the delay circuit 22 for controlling the bipolar transistor switch 330 is connected to the bipolar transistor switch 330.

In the modified example 2, the power source 32 provided in the engine control device 300 in FIG. 8 is omitted and a power source 31 is employed. The current system D is configured to cause electricity to flow from the power source 31 to the ground part 25 via a portion of the current system B and the current system C.

According to the modified example 2, it is possible to achieve the same effect as the first embodiment. In addition, one switch and one power source can be omitted and also a diode 30 which is provided downstream from the switch 28 in FIG. 8 to prevent the back-flow of the electric current to the power source can be omitted as compared to the first embodiment to save manufacturing cost.

Modified Example 3

Figure 12:
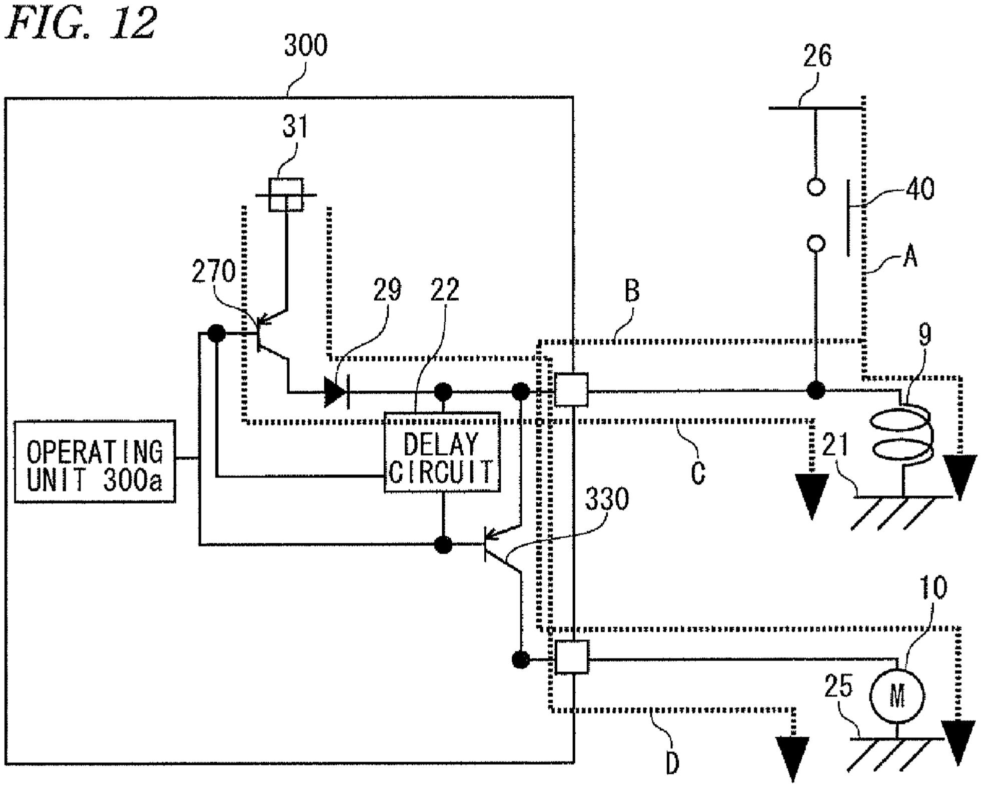
FIG. 12 is a circuit diagram for explaining an engine control device and a starter system in the modified example 3 of the first embodiment.

The modified example 3 of the first embodiment will be described by referring to FIG. 12. In particular, the difference with the first embodiment shown in FIG. 8 will be mainly explained.

In the modified example 3, the switch 28 indicated as MOS transistor switch, the power source 32 and the diode 30 provided in the first embodiment shown in FIG. 8 are omitted.

In the modified example 3, the switch 33 indicated as bipolar transistor switch and the switch 28 indicated as MOS transistor switch in FIG. 8 are realized by one bipolar transistor switch 330. A control line of the operating unit 300*a* and the delay circuit 22 for controlling the bipolar transistor switch 330 is connected to the bipolar transistor switch 330.

In the modified example 3, the switch 27 indicated as MOS transistor switch in FIG. 8 is substitute with the bipolar transistor switch 270.

In the modified example 3, the power source 32 provided in the engine control device 300 in FIG. 8 is omitted and a power source 31 is employed. The current system D is configured to cause electricity to flow from the power source 31 to the ground part 25 via a portion of the current system B and the current system C.

According to the modified example 3, it is possible to achieve the same effect as the first embodiment. In addition, one switch and one power source can be omitted and also two diodes which are provided downstream from the switch 28 in FIG. 8 to prevent the back-flow of the electric current to the power source can be omitted as compared to the first embodiment to save manufacturing cost.

Modified Example 4

Figure 13:
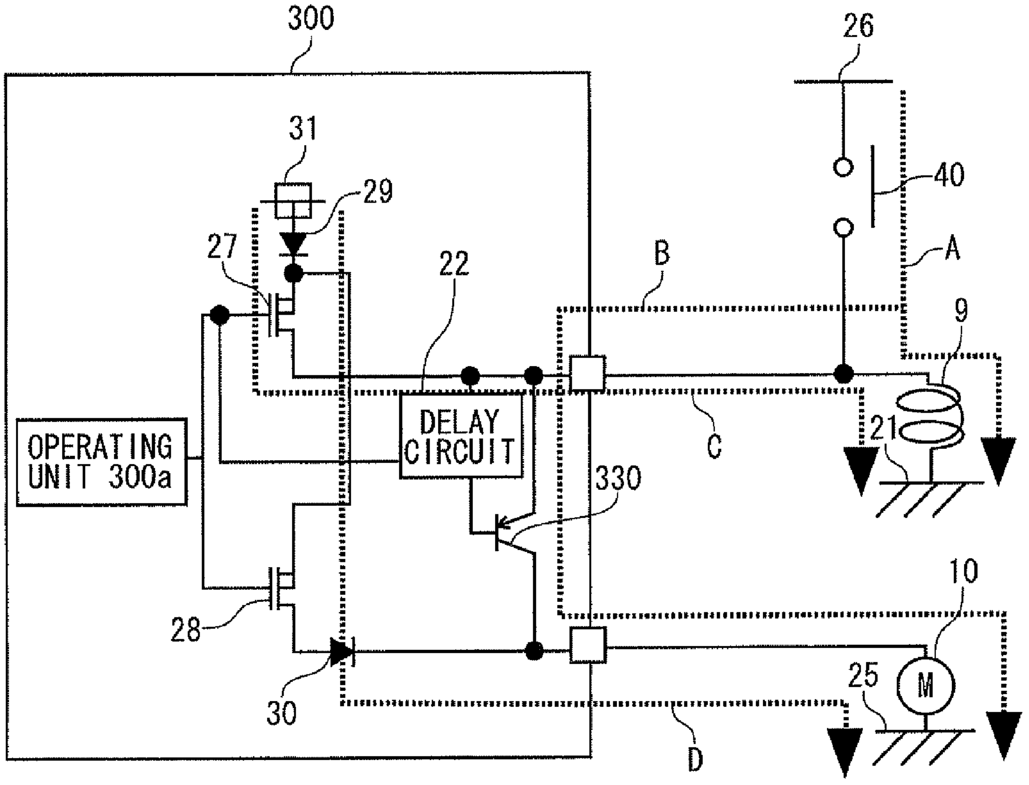
FIG. 13 is a circuit diagram for explaining an engine control device and a starter system in the modified example 4 of the first embodiment.

The modified example 4 of the first embodiment will be described by referring to FIG. 13. In particular, the difference with the first embodiment shown in FIG. 8 will be mainly explained.

In the modified example 4, the power source 32 provided in the first embodiment shown in FIG. 8 are omitted.

According to the modified example 4, the power source 32 in FIG. 8 is realized by one power source 31. The switch 28 indicated as MOS transistor switch uses the power source 31 as an electric current source in the current system D. Accordingly, the current system D is branched from a portion of the current system C between the power source 31 and the switch 28 indicated as MOS transistor switch. Further, the diode 29 is provided between the power source 31 and the switch 27 in the current system C and the delay circuit 22 includes a monitor line which monitors the electric current of the operating unit 300*a* and is connected to between the switch 27 and the operating unit 300*a*.

According to the modified example 4, it is possible to achieve the same effect as the first embodiment. In addition, one power source can be omitted as compared to the first embodiment to save manufacturing cost.

Modified Example 5

Figure 14:
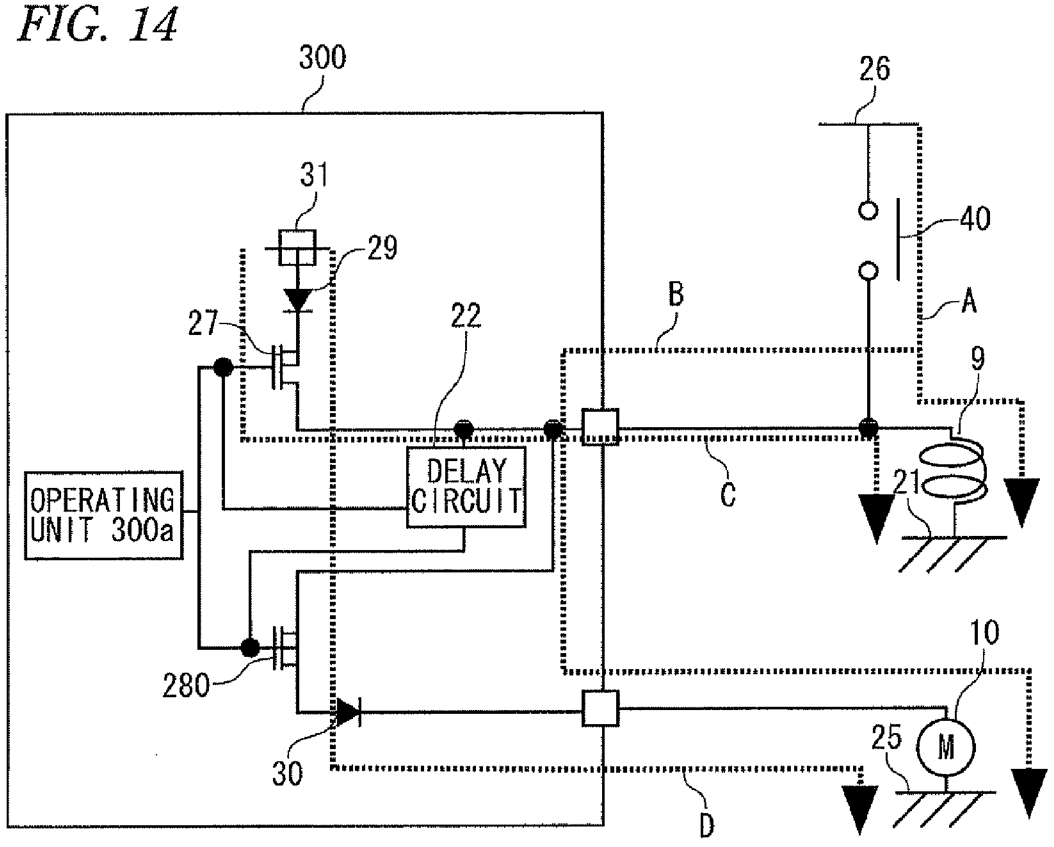
FIG. 14 is a circuit diagram for explaining an engine control device and a starter system in the modified example 5 of the first embodiment.

The modified example 5 of the first embodiment will be described by referring to FIG. 14. In particular, the difference with the first embodiment shown in FIG. 8 will be mainly explained.

In the modified example 5, the switch 33 indicated as bipolar transistor switch and the power source 32 provided in the first embodiment shown in FIG. 8 are omitted.

In the modified example 5, the switch 33 indicated as bipolar transistor switch and the switch 28 indicated as MOS transistor switch in FIG. 8 are realized by one MOS transistor switch 280. A control line of the operating unit 300*a* and the delay circuit 22 for controlling the MOS transistor switch 280 is connected to the MOS transistor switch 280.

In the modified example 5, the power source 32 provided in the engine control device 300 in FIG. 8 is omitted and a power source 31 is employed. The current system D is configured to cause electricity to flow from the power source 31 to the ground part 25 via a portion of the current system B and the current system C. Further, the delay circuit 22 monitors the control current of the operating unit 300*a* via a monitor line which is connected between the switch 27 indicated as the MOS transistor switch and the operating unit 300*a*.

According to the modified example 5, it is possible to achieve the same effect as the first embodiment. In addition, one switch and one power source can be omitted as compared to the first embodiment to save manufacturing cost.

Modified Example 6

Figure 15:
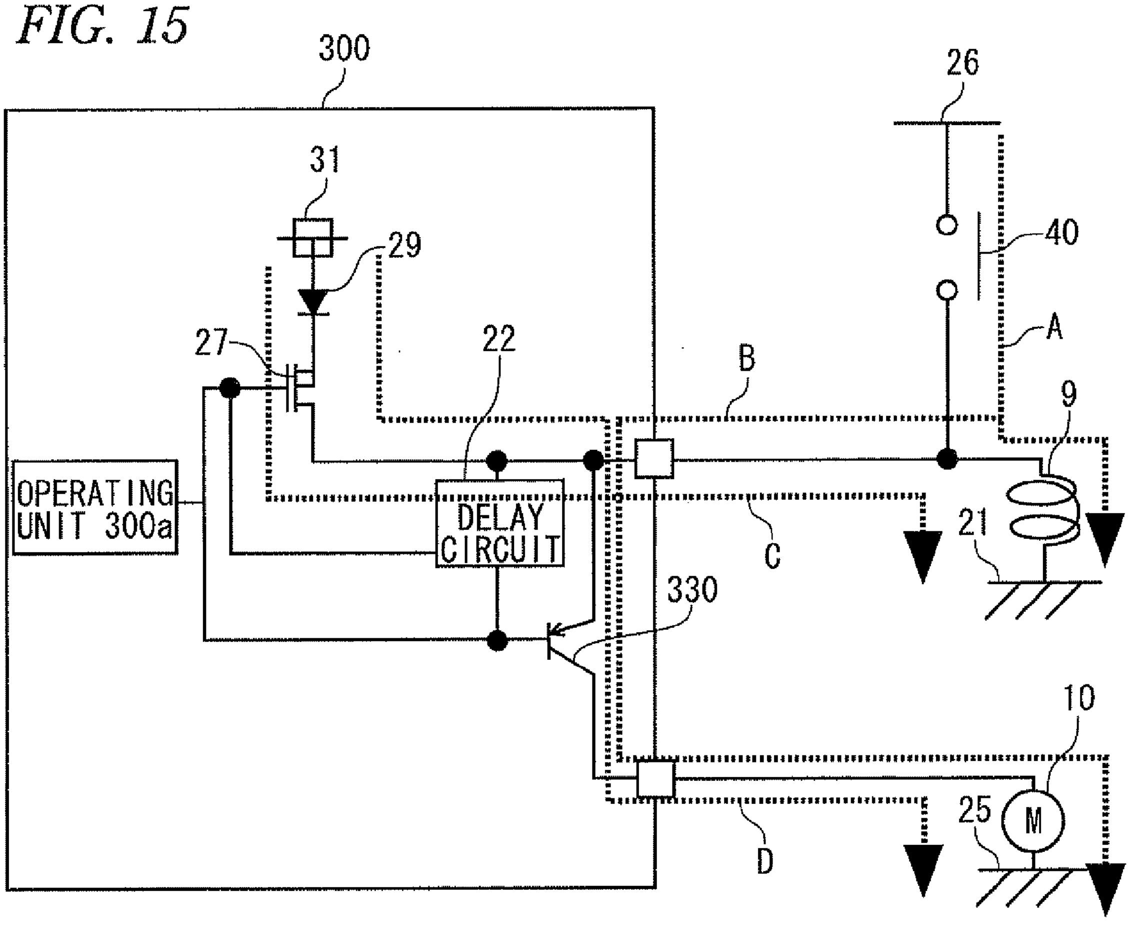
FIG. 15 is a circuit diagram for explaining an engine control device and a starter system in the modified example 6 of the first embodiment.

The modified example 6 of the first embodiment will be described by referring to FIG. 15. In particular, the difference with the first embodiment shown in FIG. 8 will be mainly explained.

In the modified example 6, the switch 28 indicated as MOS transistor switch, the power source 32 and the diode 30 provided in the first embodiment shown in FIG. 8 are omitted.

In the modified example 6, the switch 33 indicated as bipolar transistor switch and the switch 28 indicated as MOS transistor switch in FIG. 8 are realized by one bipolar transistor switch 330. A control line of the operating unit 300*a* and the delay circuit 22 for controlling the bipolar transistor switch 330 is connected to the bipolar transistor switch 330. In addition, the diode 29 is provided between the power source 31 and the switch 27 indicated as MOS transistor switch in the current system C. Further, the delay circuit 22 monitors the control current of the operating unit 300*a* via a monitor line which is connected between the switch 27 indicated as the MOS transistor switch and the operating unit 300*a*.

In the modified example 6, the power source 32 provided in the engine control device 300 in FIG. 8 is omitted and a power source 31 is employed. The current system D is configured to cause electricity to flow from the power source 31 to the ground part 25 via a portion of the current system B and the current system C.

According to the modified example 6, it is possible to achieve the same effect as the first embodiment. In addition, one switch and one power source can be omitted and also a diode 30 which is provided downstream from the switch 28 in FIG. 8 to prevent the back-flow of the electric current to the power source can be omitted as compared to the first embodiment to save manufacturing cost.

Modified Example 7

Figure 16:
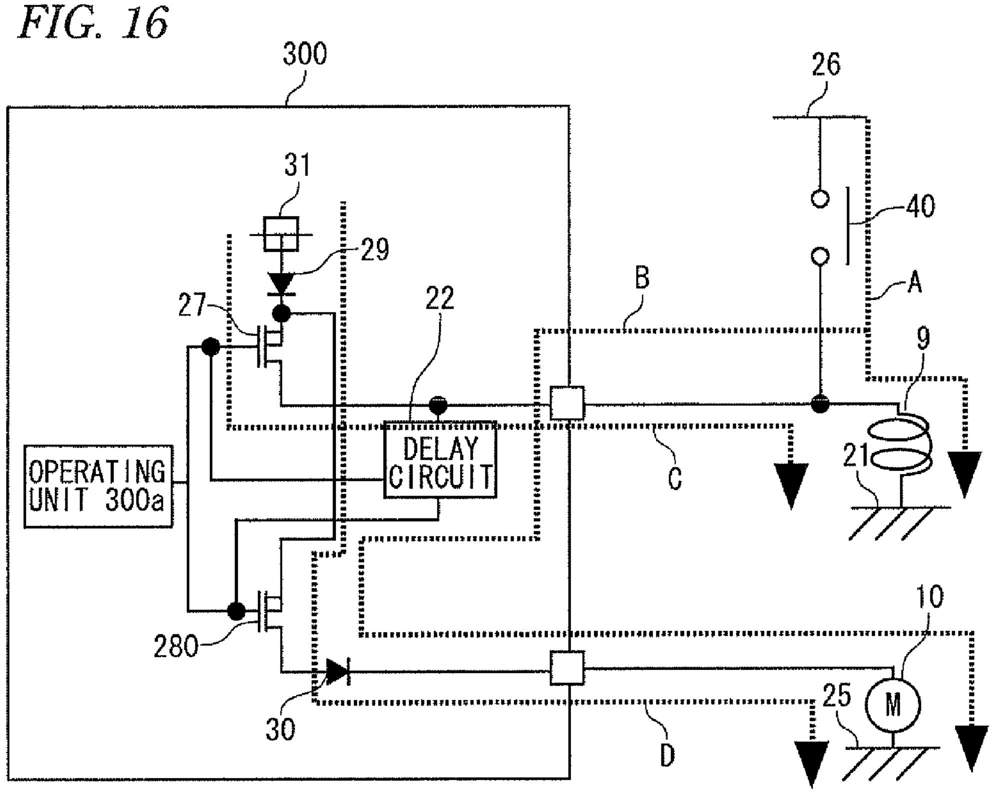
FIG. 16 is a circuit diagram for explaining an engine control device and a starter system in the modified example 7 of the first embodiment.

The modified example 7 of the first embodiment will be described by referring to FIG. 16. In particular, the difference with the first embodiment shown in FIG. 8 will be mainly explained.

In the modified example 7, the switch 33 indicated as bipolar transistor switch and the power source 32 provided in the first embodiment shown in FIG. 8 are omitted.

In the modified example 7, the switch 33 indicated as bipolar transistor switch and the switch 28 indicated as MOS transistor switch in FIG. 8 are realized by one MOS transistor switch 280. A control line of the operating unit 300*a* and the delay circuit 22 for controlling the MOS transistor switch 280 is connected to the MOS transistor switch 280.

In the modified example 7, the power source 32 provided in the engine control device 300 in FIG. 8 is omitted and a power source 31 is employed. The current system B is configured to cause electricity to flow from the power source 31 to the ground part 25 and the current system D is configured to cause electricity to flow from the power source 31 to the ground part 25.

Further, the delay circuit 22 monitors the control current of the operating unit 300*a* via a monitor line which is connected between the switch 27 indicated as the MOS transistor switch and the operating unit 300*a*.

According to the modified example 7, it is possible to achieve the same effect as the first embodiment. In addition, one switch and one power source can be omitted as compared to the first embodiment to save manufacturing cost.

<Second Embodiment>

Figure 17:
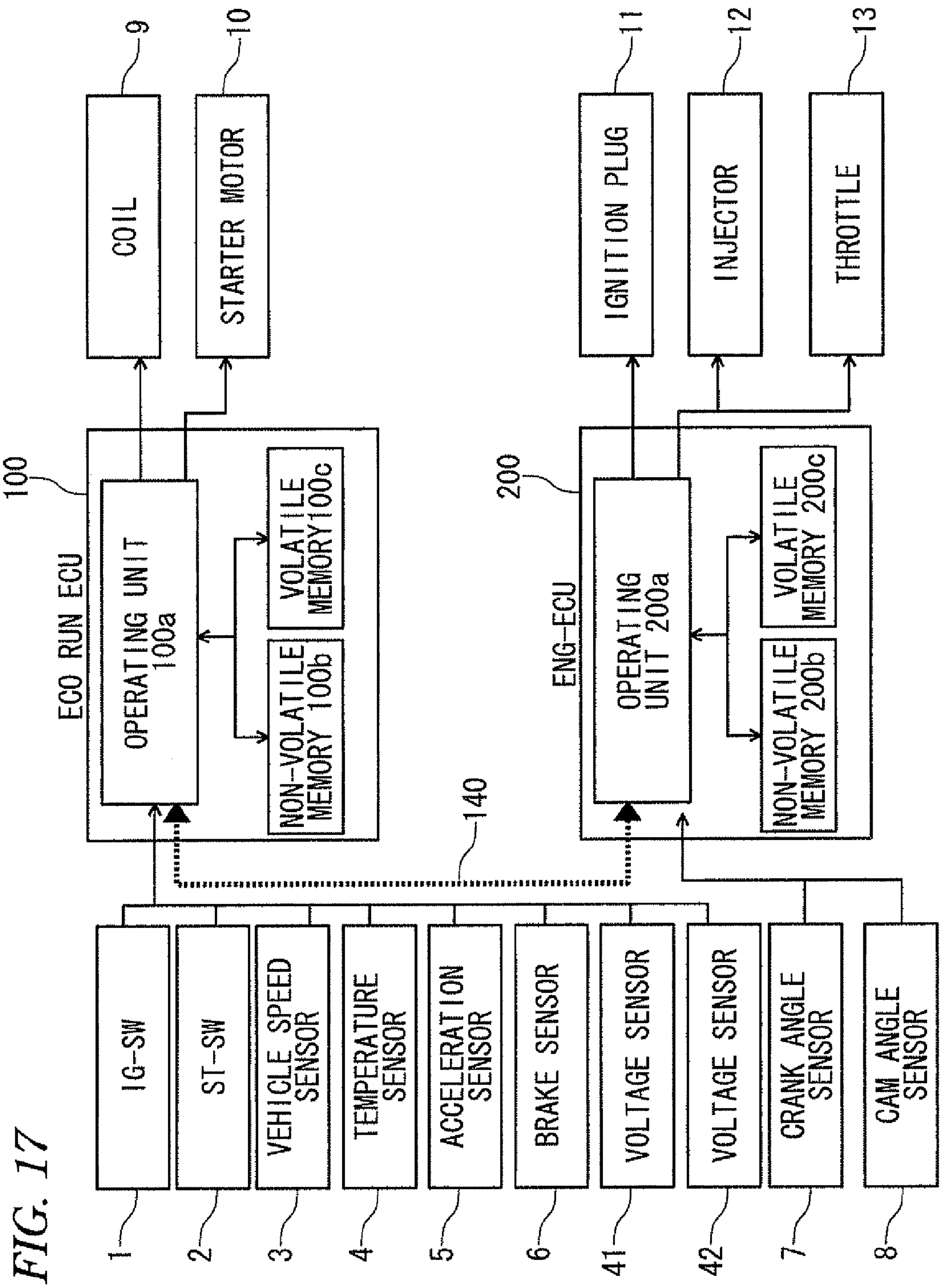
FIG. 17 is a block diagram for explaining the engine control device in the first embodiment of the present invention.
Figure 18:
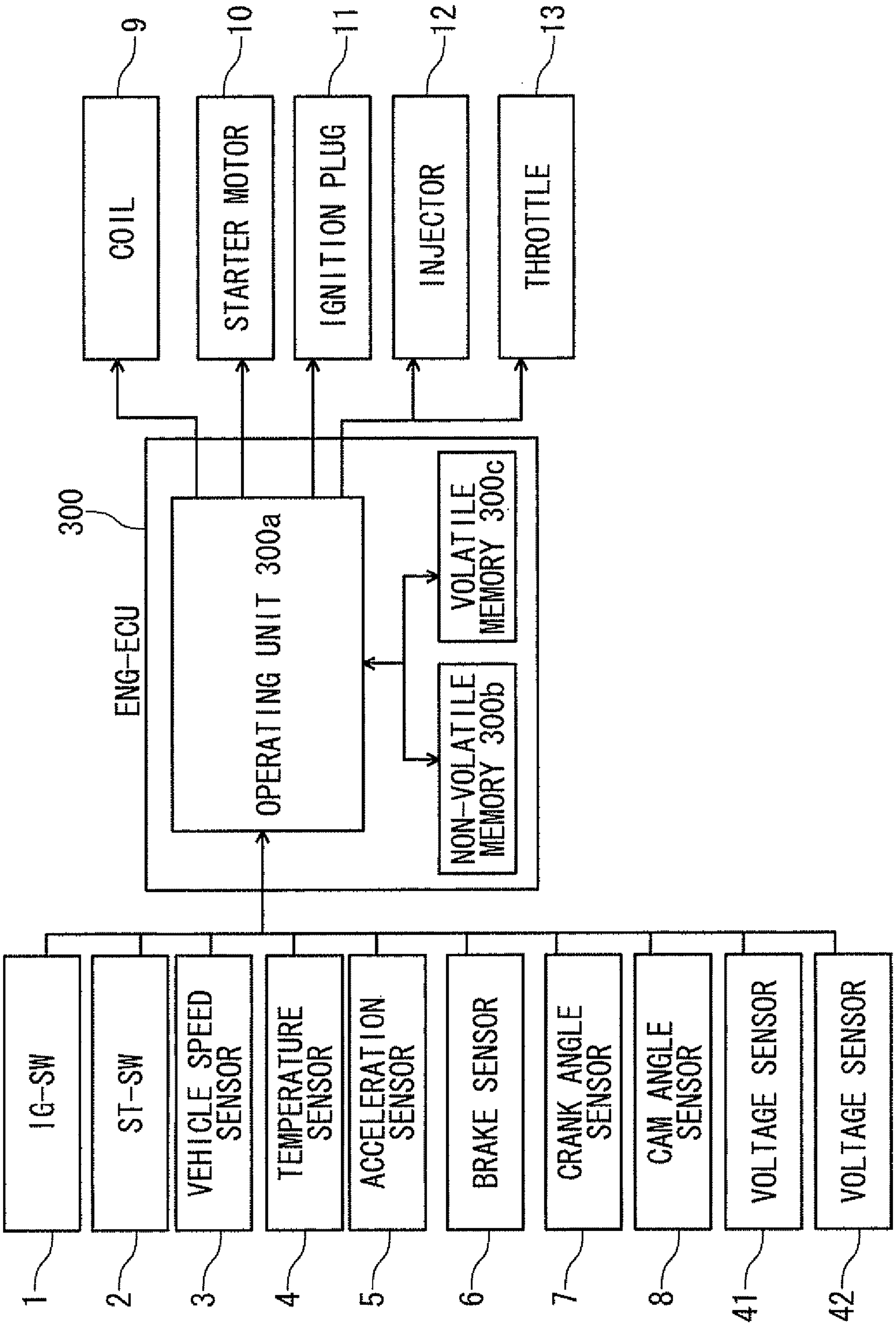
FIG. 18 is a block diagram for explaining an engine control device in a second embodiment of the present invention.

Hereinafter, the second embodiment of the present invention will be explained. The same or similar element will be denoted by the same reference numeral as that of the first embodiment, and the duplicated explanation thereof will be omitted As shown in FIGS. 17 and 18, a signal from voltage detecting units 41, 42 detecting a voltage in the current system is input via the input/output units into the idling stop-ECU 100 and the ENG-ECU 300 in the second embodiment.

Figure 19:
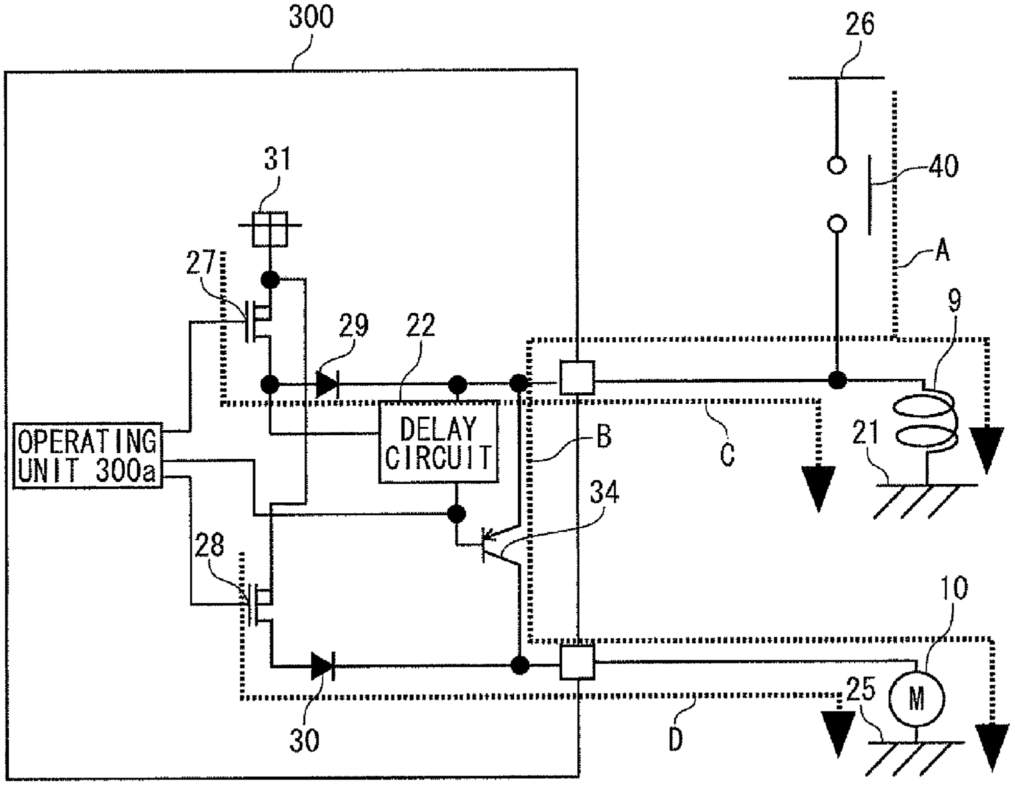
FIG. 19 is a circuit diagram for explaining the engine control device and a starter system in the second embodiment.

As shown in FIG. 19, in the second embodiment, the power source 32 provided in the engine control device 300 in FIG. 8 is omitted.

According to the second embodiment, the power source 32 in FIG. 8 is realized by one power source 31. The switch 28 indicated as MOS transistor switch uses the power source 31 as an electric current source in the current system D. Accordingly, the current system D is branched from a portion of the current system C between the power source 31 and the switch 28 indicated as MOS transistor switch.

The delay circuit 22 is configured to delay the flow of the electric current in the current system B. A signal line branched from between the switch 27 and the diode 29 in the current system C and a signal line branched from the diode to a downstream side thereof in the current system C are taken in the delay line 22 to monitor whether the starting switch 40 is turned on to cause electricity to flow in the current system B or the operating unit 300*a* turns on the switch 27 to cause electricity to flow in the current system B. The delay circuit 22 can determine by the operation of the logic circuit whether the electricity flows through either of the signal lines, based on a signal from a monitor line taken in the delay circuit. When it is determined that the starting switch 40 is turned on to cause the electricity to flow in the current system B, the electricity is caused to flow in the current system B upstream from the switch 33 and then delayed, and the switch 33 is turned on to cause the electricity to flow to the ground part 25, and then the starter motor 10 can be driven. When it is determined that the operating unit 300*a* turns on the switch 27 to cause electricity to flow in the current system B, the switch 33 is maintained in an off state without being turned on.

Figure 21:
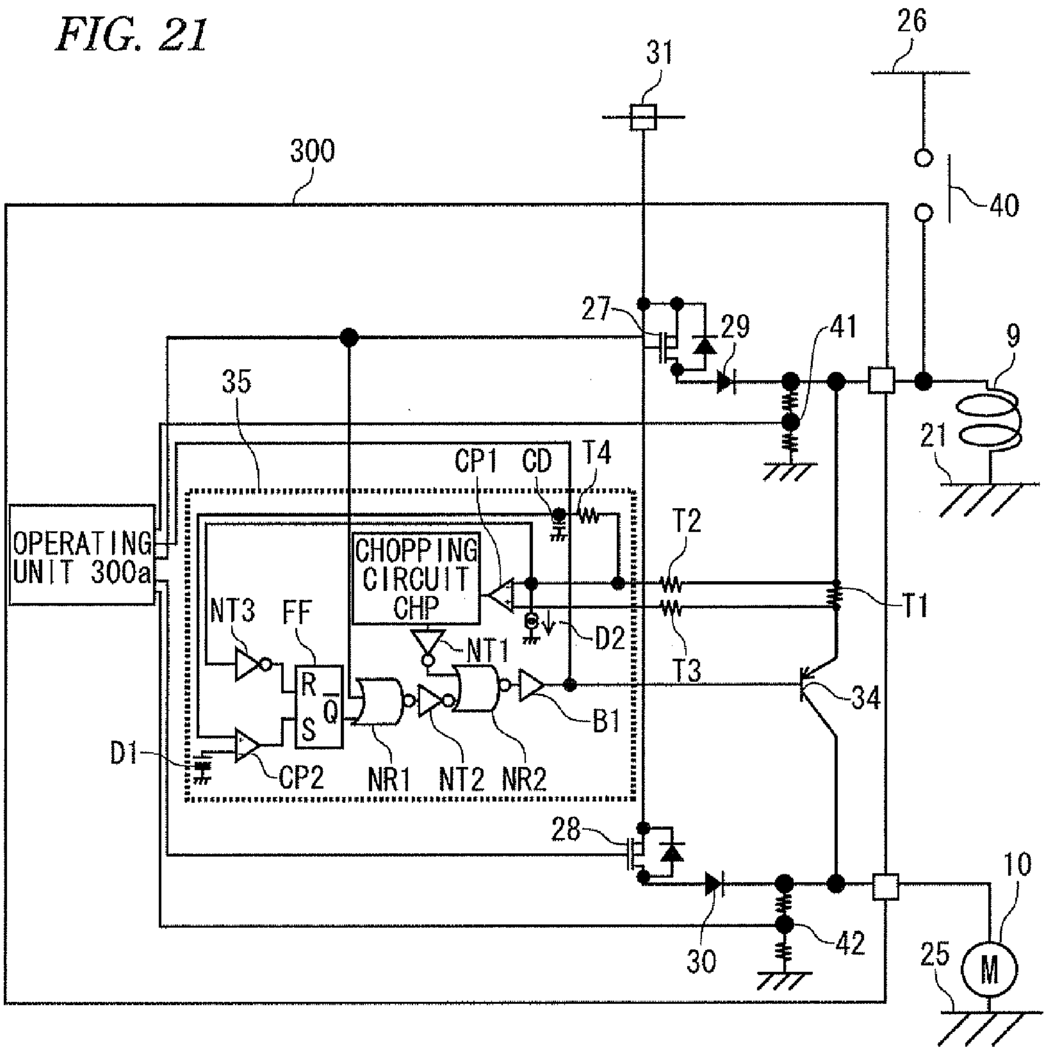
FIG. 21 is a circuit diagram for explaining the engine control device and the starter system in the second embodiment.

As shown in FIG. 19 and FIG. 21, since the current system A and the current system C cause electricity to flow from the power source 26 and the power source 31 upstream of each current system to a common ground part 21, a portion downstream from the starting switch 40 provided in the current system A and a portion downstream from the switch 27 provided in the current system C are joined with each other and a portion downstream from a joined part therebetween is commonly used.

As shown in FIG. 19 and FIG. 21, since the current system B and the current system D cause electricity to flow from the power source 26 and the power source 31 upstream of each current system to a common ground part 25, a portion downstream from the switch 33 provided in the current system B and a portion downstream from the switch 28 provided in the current system D are joined with each other and a portion downstream from a joined part therebetween is commonly used.

Further, a basic of each power source is a battery installed in the vehicle.

According to the second embodiment, it is possible to achieve the same effect as the first embodiment. In addition, one power source can be omitted as compared to the first embodiment to save manufacturing cost.

<Fail-safe Control in Startup Control of Engine by Turning on Starting Switch>

When the startup control of the engine is controlled by operating the starter switch 2 to turn on the starting switch 40, it is possible to engage the pinion gear 18 with the ring gear 19 by actuating the drive lever 16 of the starter system, but it is not possible to drive the starter motor 10, if the switch 33 is in a state of the off-fixation error.

The off-fixation error of the switch 33 means a state in which the switch 33 is maintained in an off state without turning on to an on state even if electricity capable of turning on the switch 33 is caused to flow by the delay circuit 22.

As mentioned above, since a faculty startup of the engine is a most important factor which significantly degrades the commodity value as compared to other malfunctions, the hardware control having a lower failure rate is used in the startup control of the engine to prevent the faculty startup of the engine. However, even in the hardware control, a failure may be occurred. In particular, there is a trend that the electronic component such as the switch 33 dynamically controlling the flow of the electricity has a high failure rate as compared to other electronic component.

Accordingly, when the switch 33 is failed, in particular when the switch is in a state of an off-fixation error, the operating unit 300*a* of the engine control device 300 performs a fail-safe control to prevent the faculty startup of the engine. This fail-safe control will be described by referring to FIG. 20.

Figure 20:
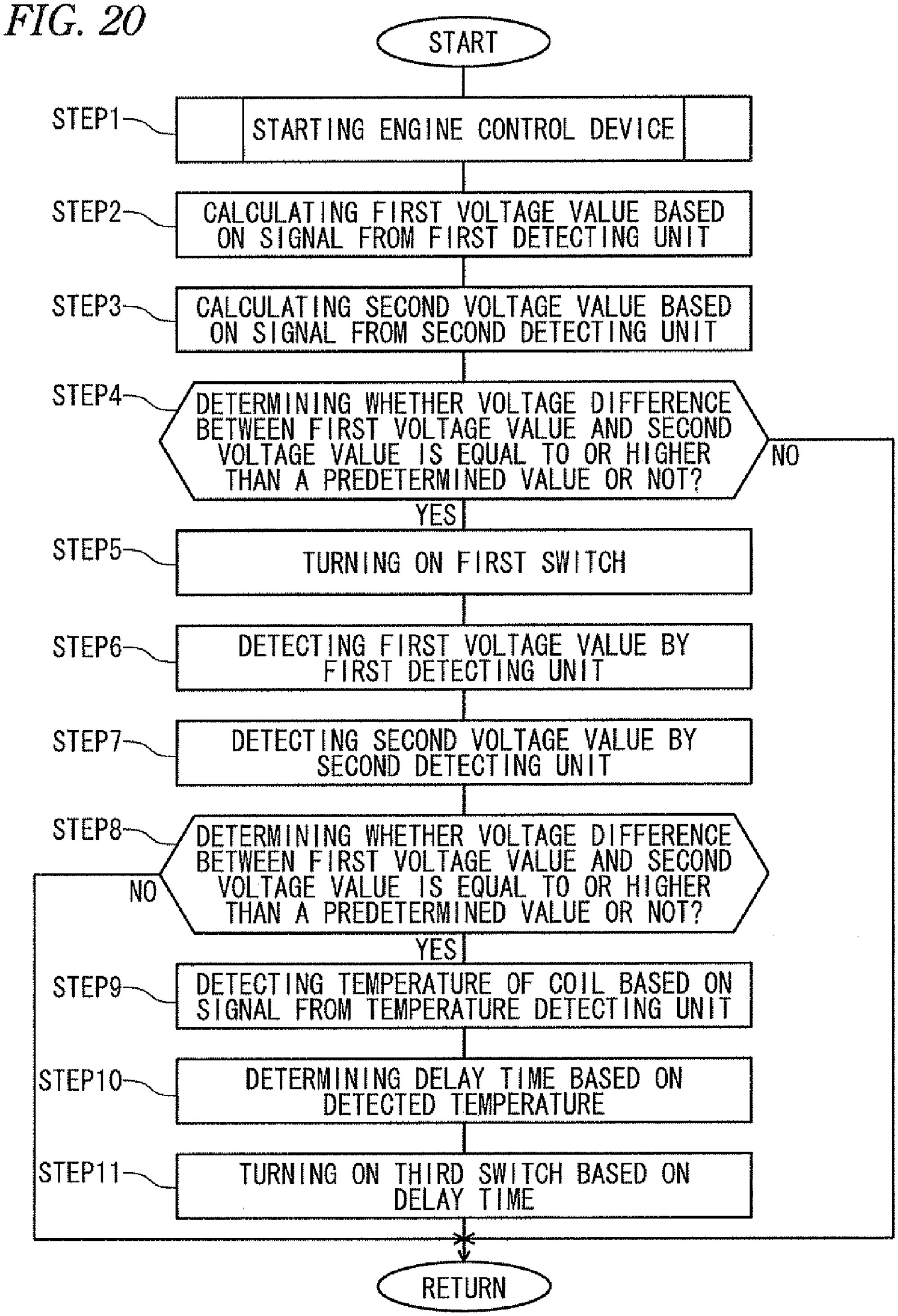
FIG. 20 is a flowchart for explaining the control of the engine in the second embodiment.

As the ignition switch 1 is turned on by user's operation, the control shown in FIG. 20 is started. When the ignition switch 1 is turned on, the electronic device including the engine control device installed in the vehicle is turned on and starts (STEP 1).

Next, the operating unit 300*a* calculates a first voltage value based on a signal from a detecting unit 41 (see FIG. 21) as a first detecting unit which detects the voltage value upstream from the switch 33 when the starting switch 40 is turned on and electricity flows from the power source 26 to the coil 9 in the current system A (STEP 2). The detecting unit 41 includes one end connected to the ground part and the other end connected to a portion of the current system C downstream from the diode 29.

In the meantime, as long as it is possible to detect the voltage value upstream from the switch 33 when electricity flows in the current system A and the current system B, the detecting unit may be provided in any one of the current system B or the current system C.

Next, the operating unit 300*a* calculates a second voltage value based on a signal from a detecting unit 42 (see FIG. 21) as a second detecting unit which detects the voltage value downstream from the switch 33 when the starting switch 40 is turned on and electricity flows from the power source 26 to the coil 9 in the current system A (STEP 3). The detecting unit 42 includes one end connected to the ground part and the other end connected to a portion of the current system D downstream from the diode 37.

Meanwhile, as long as it is possible to detect the voltage value downstream from the switch 33 when electricity flows in the current system A and the current system B, the detecting unit may be provided in any one of the current system B or the current system D.

Next, when a value obtained by subtracting the calculated second voltage value from the calculated first voltage value is equal to or larger than a predetermined value, the operating unit 300*a* is controlled so that the electric current does not flow in the downstream from the switch 33. That is, the switch 33 is determined as being in a state of a temporary off-fixation error and thus the process proceeds to STEP 5 (YES in STEP 4). In contrast, when the obtained value is lower than the predetermined value, the electric current is caused to flow in the downstream from the switch 33. That is, the switch 33 is determined as being not in a state of an off-fixation error and thus the process proceeds to Return (NO in STEP 4). When it is determined that the switch 33 is not in the state of the off-fixation error and thus the process proceeds to Return, the fail-safe control shown in FIG. 20 is repeatedly performed during a predetermined time.

When it is determined that the switch 33 is in a state of a temporary off-fixation error, the operating unit 300*a* controls the switch 33 to be turned on (STEP 5).

Next, the operating unit 300*a* calculates a first voltage value based on a signal from a detecting unit 41 (STEP 6).

Next, the operating unit 300*a* calculates a second voltage value based on a signal from a detecting unit 42 (STEP 7).

Next, when a value obtained by subtracting the calculated second voltage value from the calculated first voltage value is equal to or larger than a predetermined value, the operating unit 300*a* determines that the switch 33 is in a state of an off-fixation error (real off-fixation error) and the process proceeds to STEP 9 (YES in STEP 8). In contrast, when the obtained value is lower than the predetermined value, the operating unit determines that the switch 33 is not in the state of the off-fixation error and the process proceeds to Return (NO in STEP 8). When it is determined that the switch 33 is not in the state of the off-fixation error and thus the process proceeds to Return, the fail-safe control shown in FIG. 20 is repeatedly performed during a predetermined time.

When it is determined that the switch 33 is in a state of a real off-fixation error, the operating unit 300*a* calculates a temperature of the coil 9 based on a signal from a temperature detecting unit 4 which detects the temperature of the coil 9 (STEP 9).

Next, the operating unit 300*a* determines a time (delay time) according to the predetermined temperature, based on a map of the calculated temperature, a temperature of the coil 9 stored on a non-volatile memory 300*b* and the delay time determined according to the temperature (STEP 10).

Next, the operating unit 300*a* turns on the switch 28 based on a time (delay time) determined according to the predetermined temperature (STEP 11). That is, the operating unit receives a signal from the detecting unit 41 and then turns on the switch 28 after the determined time lapses, and thus the electric current is caused to flow from the power source 31 to the ground part 25, so that the starter motor 10 can be driven.

When such a fail-safe control is performed, it is possible to complete the control of the operating unit 300*a*, without repeating the control shown in FIG. 20 during a predetermined time.

By performing such a fail-safe control, it is possible to prevent a faculty startup of the engine as one of a most important factor which degrades the commodity value.

<Fail-safe Control in Startup Control of the Engine Using Idling Stop Function>

When the startup control of the engine using the idling stop function is performed, it is possible to engage the pinion gear 18 with the ring gear 19 by actuating the drive lever 16 of the starter system, but it is not possible to drive the starter motor 10, if the switch 28 is in a state of the off-fixation error.

Even if the startup control using the idling stop function is performed, it is still required that the faculty startup of the engine is prevented as much as possible.

Accordingly, when the switch 28 is failed, in particular when the switch is in a state of an off-fixation error, the operating unit 300*a* of the engine control device 300 performs a fail-safe control to prevent the faculty startup of the engine. This fail-safe control will be described by referring to FIG. 22.

Figure 22:
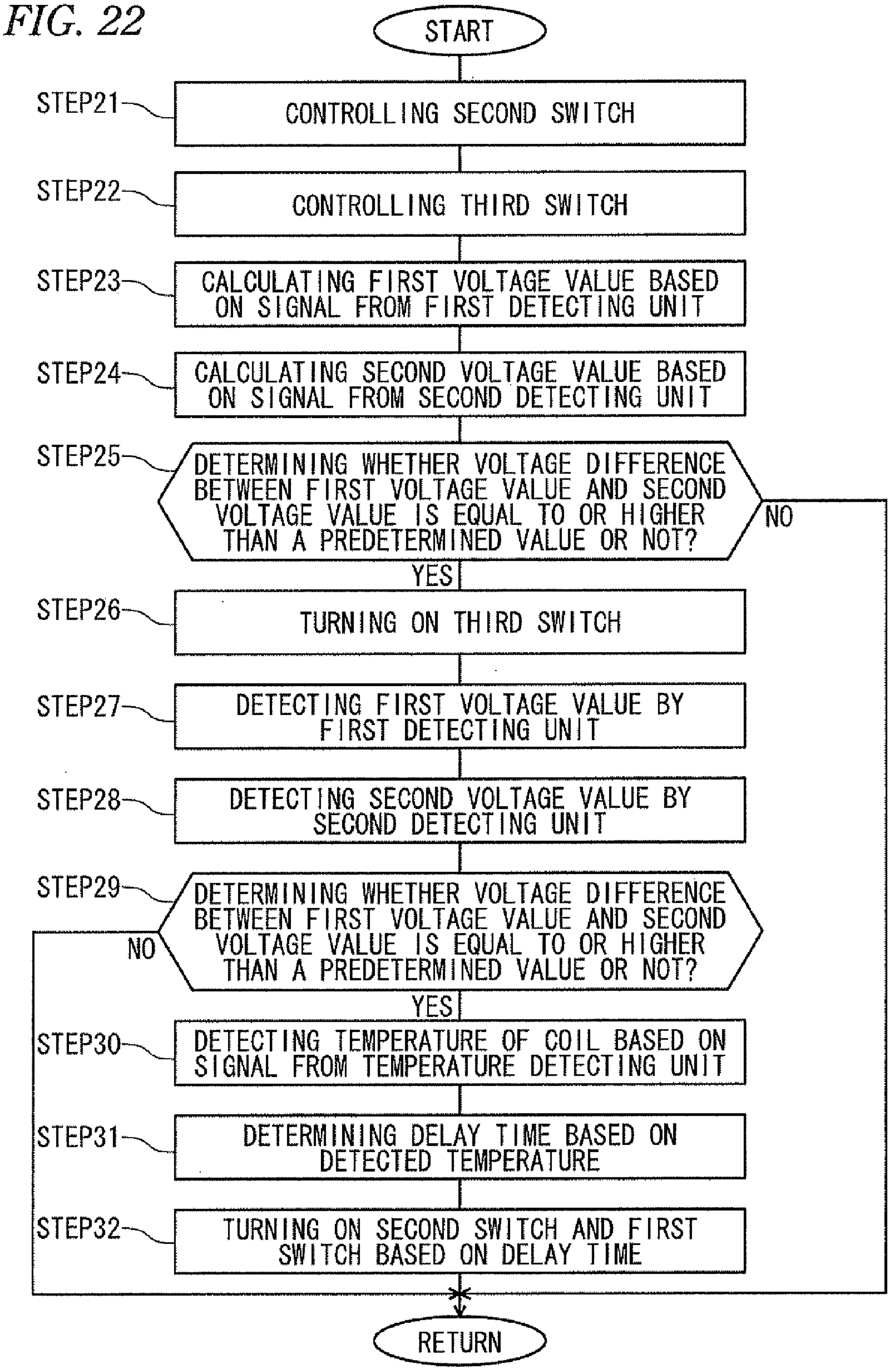
FIG. 22 is a flowchart for explaining the control of the engine.

When the startup of the engine is controlled by the idling stop function, the control shown in FIG. 22 is started. First, the operating unit 300*a* controls the switch 27 to be turned on (STEP 21).

Next, the operating unit 300*a* controls the switch 28 to be turned on (STEP 22).

Next, the operating unit 300*a* calculates a first voltage value based on a signal from a detecting unit 41 (see FIG. 21) which detects the voltage value downstream from the switch 27 when the switch 27 is turned on and electricity flows from the power source 31 to the coil 9 in the current system C (STEP 23). The detecting unit 41 includes one end connected to the ground part and the other end connected to a portion of the current system C downstream from the switch 27.

In the meantime, as long as it is possible to detect the voltage value downstream from the switch 27 when electricity flows in the current system C, the detecting unit may be provided in any one of the current system B or the current system C.

Next, the operating unit 300*a* calculates a second voltage value based on a signal from a detecting unit 42 (see FIG. 21) which detects the voltage value downstream from the switch 28 when the switch 28 is turned on and electricity flows from the power source 31 to the starter motor 10 in the current system D (STEP 24). The detecting unit 42 includes one end connected to the ground part and the other end connected to a portion of the current system D downstream from the diode 30.

Meanwhile, as long as it is possible to detect the voltage value downstream from the switch 28 when electricity flows in the current system D, the detecting unit may be provided in any one of the current system B or the current system D.

Next, when a value obtained by subtracting the calculated second voltage value from the calculated first voltage value is equal to or larger than a predetermined value, the operating unit 300*a* is controlled so that the electric current does not flow in the downstream from the switch 28. That is, the switch 28 is determined as being in a state of a temporary off-fixation error and thus the process proceeds to STEP 26 (YES in STEP 25). In contrast, when the obtained value is lower than the predetermined value, the electric current is caused to flow in the downstream from the switch 28. That is, the switch 28 is determined as being not in a state of an off-fixation error and thus the process proceeds to Return (NO in STEP 25). When it is determined that the switch 28 is not in the state of the off-fixation error and thus the process proceeds to Return, the fail-safe control shown in FIG. 22 is repeatedly performed during a predetermined time.

When it is determined that the switch 28 is in a state of a temporary off-fixation error, the operating unit 300*a* controls the switch 28 to be turned on (STEP 26).

Next, the operating unit 300*a* calculates a first voltage value based on a signal from a detecting unit 41 (STEP 27).

Next, the operating unit 300*a* calculates a second voltage value based on a signal from a detecting unit 42 (STEP 28).

Next, when a value obtained by subtracting the calculated second voltage value from the calculated first voltage value is equal to or larger than a predetermined value, the operating unit 300*a* determines that the switch 28 is in a state of an off-fixation error (real off-fixation error) and the process proceeds to STEP 30 (YES in STEP 29). In contrast, when the obtained value is lower than the predetermined value, the operating unit determines that the switch 28 is not in the state of the off-fixation error and the process proceeds to Return (NO in STEP 29). When it is determined that the switch 28 is not in the state of the off-fixation error and thus the process proceeds to Return, the fail-safe control shown in FIG. 22 is repeatedly performed during a predetermined time.

When it is determined that the switch 28 is in a state of a real off-fixation error, the operating unit 300*a* calculates a temperature of the coil 9 based on a signal from a temperature detecting unit 4 which detects the temperature of the coil 9 (STEP 30).

Next, the operating unit 300*a* determines a time (delay time) according to the predetermined temperature, based on a map of the calculated temperature, a temperature stored on a non-volatile memory 300*b* and the delay time (STEP 31).

Next, the operating unit 300*a* turns on the switch 27 and the switch 33 based on a time (delay time) determined according to the predetermined temperature (STEP 32). That is, the operating unit turns on the switch 27 and then turns on the switch 33 after the determined time lapses, and thus the electric current is caused to flow from the power source 31 to the ground part 25, so that the starter motor 10 can be driven.

When such a fail-safe control is performed, it is possible to complete the control of the operating unit 300*a*, without repeating the control shown in FIG. 22 during a predetermined time.

By performing such a fail-safe control, it is possible to prevent a faculty startup of the engine as one of a most important factor which degrades the commodity value.

Hereinabove, although the second embodiment of the present invention is described, the present invention is not limited to the second embodiment and various modifications can be considered.

This application is based upon and claims the benefits of priority from Japanese Patent Application No. 2009-195705, filed on Aug. 26, 2009 and Japanese Patent Application No. 2009-207098, filed on Sep. 8, 2009, the entire content of which is incorporated herein by reference.

Description of Reference Numerals

1 Ignition switch
2 Starter switch
9 Coil
10 Starter motor
11 Ignition unit
12 Fuel injection unit
13 Intake unit
14 Plunger
15 Electromagnet
16 Drive lever
18 Pinion gear
19 Ring gear
22 Delay circuit
40 Starting switch
B1 Buffer circuit
CD Capacitor
CHP Chopping circuit
CP1 Comparator circuit
CP1 Comparator
CP2 Comparator
D1 Voltage source
D2 Current source
FF Flip-flop Circuit
NRI NOR circuit
NR2 NOR circuit
NT1 NOT circuit
NT2 NOT circuit
NT3 NOT circuit
SPD Vehicle speed
T1 Resistance
T2 Resistance
T4 Resistance

The invention claimed is:

1. An engine control device for controlling a startup of an engine in a vehicle by directing an electric current from a power source to a starter motor and a coil for switching a connection state between an output shaft of the starter motor and the engine, the engine control device comprising:

a delay unit configured to delay and cut-off a flow of the electric current from a first current system which directs the electric current to the coil to a second current system which directs the electric current to the starter motor; and a control unit configured to control a first switch to be energized by turning on the electric current from the power source to the first current system and to be cut-off by turning off the electric current from the power source to the first current system, and to control a second switch to be energized by turning on the electric current from the power source to the second current system and to be cut-off by turning off the electric current from the power source to the second current system, wherein the delay unit delays a flow of the electric current from the first current system to the second current system when a starting switch which is configure to be energized when a user turns on the electric current from the power source to the first current system and to be cut off when the user turns off the electric current from the power source to the first current system is turned on to cause the electric current to flow in the first current system, and wherein the delay unit cuts off the flow of the electric current from the first current system to the second current system when the first switch is turned on to cause the electric current to flow in the first current system.

2. The engine control device according to claim 1, wherein the delay unit causes the electric current to flow in the second current system at a timing delayed from a timing when the starting switch is turned on to cause the electric current to flow in the first current system.

3. The engine control device according to claim 1, wherein the control unit turns on the second switch to cause the electric current to flow in the starter motor at a timing delayed from a timing when the first switch is turned on to cause the electric current to flow in the coil.

4. The engine control device according to claim 1, further comprising a temperature detecting unit configured to detect a temperature of the coil, wherein the control unit turns on the first switch to cause the electric current to flow in the coil, and then turns on the second switch to cause the electric current to flow in the starter motor after a predetermined time determined according to the temperature.

5. The engine control device according to claim 1, further comprising a detecting unit configured to detect that an accelerator operation is performed by user's operation, wherein the control unit turns on the first switch when the accelerator operation is turned on in a state where the engine is stopped by an idling stop function.

6. The engine control device according to claim 5, wherein the idling stop function causes the accelerator operation to be turned off when a speed of the vehicle is equal to or higher than a predetermined speed and causes the engine to be stopped when the speed of the vehicle is lower than the predetermined speed.

7. The engine control device according to claim 5, wherein the idling stop function causes the accelerator operation to be turned off when a rpm of the engine is equal to or higher than a predetermined rpm and causes the engine to be stopped when the rpm of the engine is lower than the predetermined rpm.

8. A vehicle comprising:

an engine;

a starter motor configured to start up the engine;

a coil configured to switch a connection state between an output shaft of the starter motor and the engine; and the engine control device according to claim 1 and configured to control a startup of the engine by directing an electric current from a power source to the starter motor and the coil.

9. An engine control device for controlling a startup of an engine in a vehicle by directing an electric current from a power source to a starter motor and a coil for switching a connection state between an output shaft of the starter motor and the engine, the engine control device comprising:

a first current system configured to direct the electric current from the power source to the coil;

a second current system branched from the first current system and configured to direct the electric current to the starter motor;

a first switch provided in the second current system and configured to energize or cut off the electric current directing from the first current system to the starter motor by being turned on or off;

a delay circuit configured to control the first switch to direct the electric current to the coil and then to direct the electric current to the starter motor while delaying the electric current directed to the coil;

a third current system configured to direct the electric current from the power source to the coil;

a second switch provided in the third current system and configured to energize or cut off the electric current directing from the power source to the coil by being turned on or off;

a fourth current system configured to direct the electric current from the power source to the starter motor;

a third switch provided in the fourth current system and configured to energize or cut off the electric current directing from the power source to the starter motor by being turned on or off;

a control unit configured to control the second switch and the third switch for performing an engine startup control;

a first detecting unit configured to detect the voltage on a side of the power source rather than the first switch provided in the second current system; and a second detecting unit configured to detect the voltage on a side of the starter motor rather than the first switch provided in the second current system, wherein the control unit controls the third switch to start up the engine when an off-fixation error of the first switch is detected based on a voltage detected by the first detecting unit and a voltage detected by the second detecting unit in a state where a starting switch is provided in the first current system and turned on by user's operation.

10. The engine control device according to claim 9, further comprising a temperature detecting unit configured to detect a temperature of the coil, wherein the control unit turns on the second switch to cause the electric current to flow in the coil, and then turns on the third switch to cause the electric current to flow in the starter motor after a predetermined time determined according to the temperature.

11. The engine control device according to claim 9, wherein the control unit turns on the first switch when a voltage difference between the voltage detected by the first detecting unit and the voltage detected by the second detecting unit is equal to or higher than a predetermined value in a state where the starting switch is turned on by user's operation, and then controls the second switch and the third switch to start up the engine when the voltage difference is still equal to or higher than the predetermined value.

12. The engine control device according to claim 9, wherein the control unit turns on the third switch, and then turns on the first switch and the second switch to direct the electric current from the third current system to the second current system when the voltage detected by the second detecting unit is equal to or lower than a predetermined voltage.

13. The engine control device according to claim 9, wherein the delay circuit controls the first switch to direct the electric current to the coil and then to direct the electric current to the starter motor while delaying the electric current directed to the coil when the starting switch is turned on by user's operation, and turns off the first switch to cut off the electric current directing to the starter motor when the second switch is turned off by the control unit.

14. A vehicle comprising:

an engine;

a starter motor configured to start up the engine;

a coil configured to switch a connection state between an output shaft of the starter motor and the engine; and the engine control device described in claim 9 and configured to control a startup of the engine by directing an electric current from a power source to the starter motor and the coil.

15. An engine control method for controlling a startup of an engine in a vehicle by directing an electric current from a power source to a starter motor and a coil for switching a connection state between an output shaft of the starter motor and the engine, the vehicle comprising:

a first current system configured to direct the electric current from the power source to the coil;

a second current system branched from the first current system and configured to direct the electric current to the starter motor;

a first switch provided in the second current system and configured to energize or cut off the electric current directing from the first current system to the starter motor by being turned on or off;

a delay circuit configured to control the first switch to direct the electric current to the coil and then to direct the electric current to the starter motor while delaying the electric current directed to the coil;

a third current system configured to direct the electric current from the power source to the coil;

a second switch provided in the third current system and configured to energize or cut off the electric current directing from the power source to the coil by being turned on or off;

a fourth current system configured to direct the electric current from the power source to the starter motor;

a third switch provided in the fourth current system and configured to energize or cut off the electric current directing from the power source to the starter motor by being turned on or off;

a control unit configured to control the second switch and the third switch for performing an engine startup control;

a first detecting unit configured to detect the voltage on a side of the power source rather than the first switch provided in the second current system; and a second detecting unit configured to detect the voltage on a side of the starter motor rather than the first switch provided in the second current system, and the engine control method comprising:

detecting an off-fixation error of the first switch based on a voltage detected by the first detecting unit and a voltage detected by the second detecting unit when a starting switch provided in the first current system is turned on by user' operation to cause the electric current to flow in the second current system; and controlling the third switch to start up the engine when the off-fixation error of the first switch is detected.

16. An engine control device for controlling a startup of an engine in a vehicle by directing an electric current from a power source to a starter motor and a coil for switching a connection state between an output shaft of the starter motor and the engine, the engine control device comprising:

a first current system configured to direct the electric current from the power source to the coil by turning on or off a starting switch mounted therein;

a second current system branched from the first current system and configured to direct the electric current to the starter motor;

a first switch provided in the second current system and configured to energize or cut off the electric current directing from the first current system to the starter motor by being turned on or off;

a delay circuit configured to control the first switch to direct the electric current to the coil and then to direct the electric current to the starter motor while delaying the electric current directed to the coil;

a third current system configured to direct the electric current from the power source to the coil;

a second switch provided in the third current system and configured to energize or cut off the electric current directing from the power source to the coil by being turned on or off;

a fourth current system configured to direct the electric current from the power source to the starter motor;

a third switch provided in the fourth current system and configured to energize or cut off the electric current directing from the power source to the starter motor by being turned on or off;

a control unit configured to control the second switch and the third switch for performing an engine startup control; and a detecting unit configured to detect the voltage on a side of the starter motor rather than the third switch provided in the second current system, wherein the control unit turns on the third switch, and then turns on the first switch and the second switch when the voltage detected by the detecting unit is equal to or lower than a predetermined voltage.

17. An engine control device for controlling a startup of an engine in a vehicle by directing an electric current from a power source to a starter motor and a coil for switching a connection state between an output shaft of the starter motor and the engine, the engine control device comprising:

a first current system configured to direct the electric current from the power source to the coil;

a second current system branched from the first current system and configured to direct the electric current to the starter motor;

a first switch provided in the second current system and configured to energize or cut off the electric current directing from the first current system to the starter motor by being turned on or off;

a delay circuit configured to control the first switch to direct the electric current to the coil and then to direct the electric current to the starter motor while delaying the electric current directed to the coil;

a third current system configured to direct the electric current from the power source to the coil;

a second switch provided in the third current system and configured to energize or cut off the electric current directing from the power source to the coil by being turned on or off;

a fourth current system configured to direct the electric current from the power source to the starter motor;

a third switch provided in the fourth current system and configured to energize or cut off the electric current directing from the power source to the starter motor by being turned on or off;

a control unit configured to control the second switch and the third switch for performing an engine startup control;

a first detecting unit configured to detect the voltage on a side of the power source rather than the first switch provided in the second current system; and a second detecting unit configured to detect the voltage on a side of the starter motor rather than the first switch provided in the second current system, wherein the control unit controls the third switch to start up the engine when a voltage difference between a voltage detected by the first detecting unit and a voltage detected by the second detecting unit is equal to or higher than a predetermined value in a state where a starting switch provided in the first current system is turned on by user's operation.

* * * * *